United States Patent
Komatsu et al.

(10) Patent No.: US 9,786,439 B2
(45) Date of Patent: Oct. 10, 2017

(54) SOLID ELECTROLYTE CAPACITOR AND HOUSING FOR SOLID ELECTROLYTE CAPACITOR

(71) Applicant: RUBYCON CORPORATION, Nagano (JP)

(72) Inventors: Akihiko Komatsu, Nagano (JP); Yoshishige Sakurai, Nagano (JP); Hiroki Tsutsui, Nagano (JP); Hayato Karasawa, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 111 days.

(21) Appl. No.: 14/781,909

(22) PCT Filed: Apr. 4, 2014

(86) PCT No.: PCT/JP2014/060040
§ 371 (c)(1),
(2) Date: Oct. 2, 2015

(87) PCT Pub. No.: WO2014/163204
PCT Pub. Date: Oct. 9, 2014

(65) Prior Publication Data
US 2016/0035495 A1 Feb. 4, 2016

(30) Foreign Application Priority Data
Apr. 5, 2013 (JP) ................................. 2013-079933

(51) Int. Cl.
*H01G 9/08* (2006.01)
*H01G 9/04* (2006.01)
(Continued)

(52) U.S. Cl.
CPC .................. *H01G 9/04* (2013.01); *H01G 9/02* (2013.01); *H01G 9/025* (2013.01); *H01G 9/06* (2013.01);
(Continued)

(58) Field of Classification Search
CPC ........................................................ H01G 9/08
See application file for complete search history.

(56) References Cited

U.S. PATENT DOCUMENTS

| 2009/0021893 A1* | 1/2009 | Kakuma | H01G 9/15 |
| | | | 361/523 |
| 2009/0109602 A1* | 4/2009 | Kakuma | H01G 9/0036 |
| | | | 361/525 |
| 2013/0163148 A1* | 6/2013 | Isii | H01G 11/22 |
| | | | 361/502 |

FOREIGN PATENT DOCUMENTS

| JP | 2000-195758 A | 7/2000 |
| JP | 2007-273928 A | 10/2007 |

(Continued)

OTHER PUBLICATIONS

International Search Report mailed Jul. 8, 2014, corresponding to International application No. PCT/JP2014/060040.

*Primary Examiner* — Eric Thomas
(74) *Attorney, Agent, or Firm* — Hauptman Ham, LLP

(57) ABSTRACT

A solid electrolyte capacitor includes a bottomed cylindrical housing having a bottom surface portion, a side surface portion raised from the bottom surface portion and an opening portion formed on an end portion of the side surface portion; a capacitor element housed in the inside of the housing, the capacitor element being formed by winding an anode foil and a cathode foil in an overlapping state with a separator interposed therebetween and by filling a solid electrolyte between the anode foil and the cathode foil; and a sealing member sealing the opening portion of the housing (Continued)

in a state where the capacitor element is housed in the inside of the housing, wherein an oxide film repairing body made of a hydrophilic synthetic resin is disposed at least one of between the bottom surface portion and the capacitor element of the housing and between the capacitor element and the sealing member.

14 Claims, 14 Drawing Sheets

(51) Int. Cl.
    *H01G 9/06*        (2006.01)
    *H01G 9/10*        (2006.01)
    *H01G 9/15*        (2006.01)
    *H01G 9/02*        (2006.01)
    *H01G 9/025*      (2006.01)

(52) U.S. Cl.
    CPC ............... *H01G 9/10* (2013.01); *H01G 9/151* (2013.01); *H01G 9/08* (2013.01)

(56) References Cited

FOREIGN PATENT DOCUMENTS

| | | |
|---|---|---|
| JP | 2009-246288 A | 10/2009 |
| JP | 2010-98131 A | 4/2010 |
| JP | 2012-44069 A | 3/2012 |

\* cited by examiner

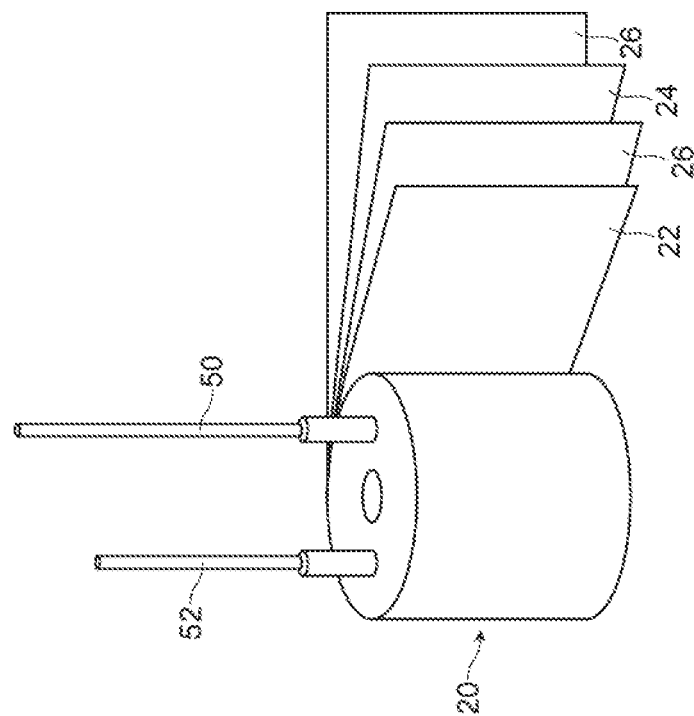
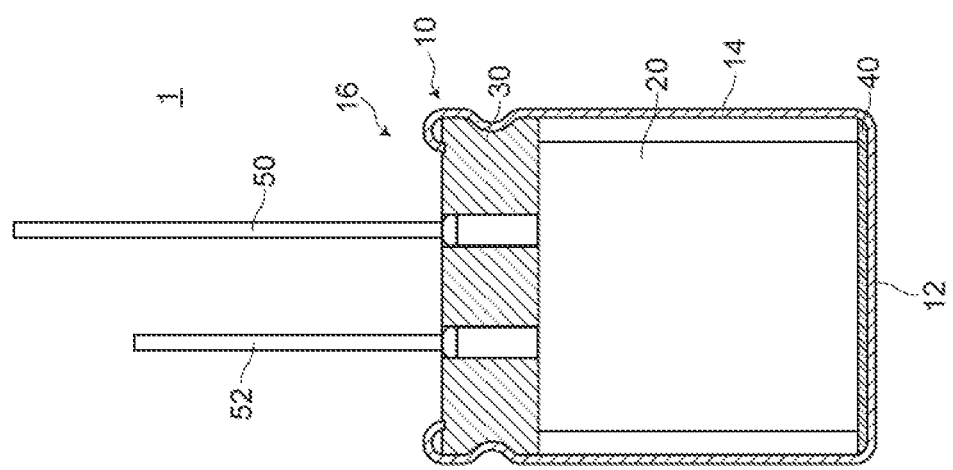
FIG. 1B
FIG. 1A

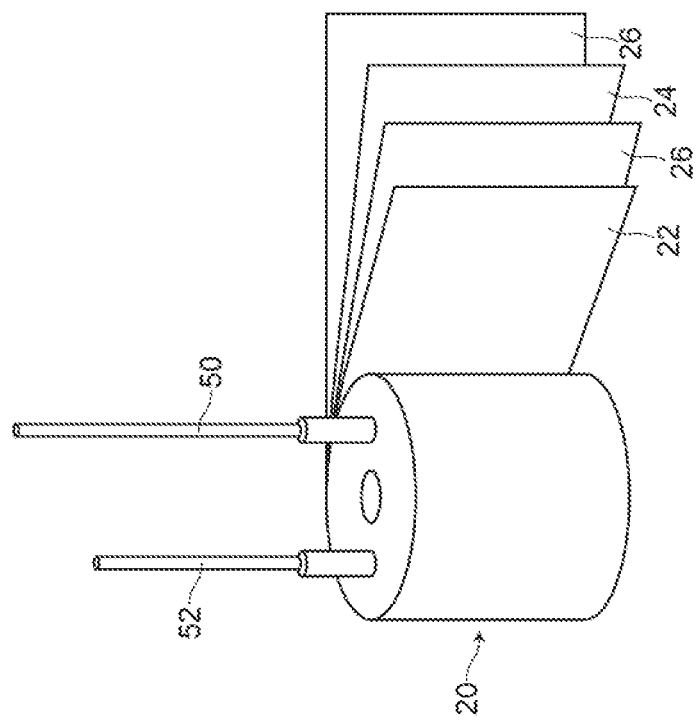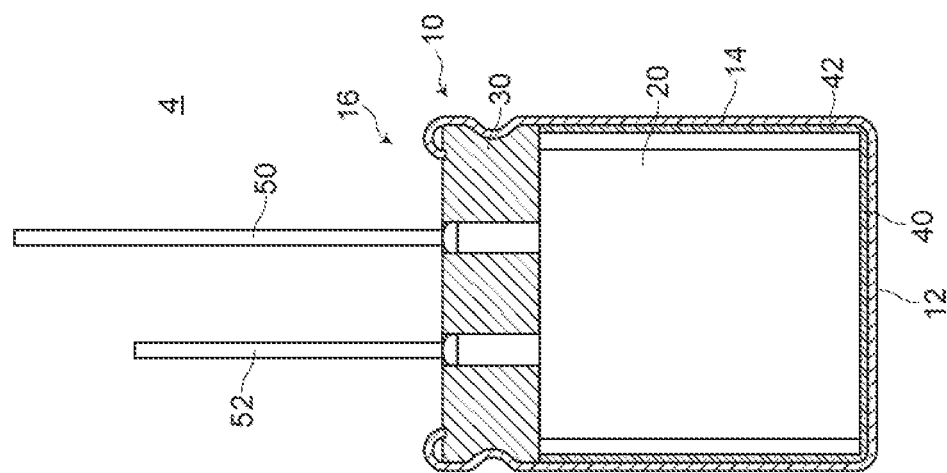
FIG.5A
FIG.5B

| data | present invention example | comparison example 1 | comparison example 2 |
|---|---|---|---|
| main component | polyacrylamide | polyvinyl alcohol | polypropyrene |
| average molecular weight | 70,000 | 22,000 | 220,000 |

FIG.12A

| | test example | present invention example | comparison example 1 | comparison example 2 |
|---|---|---|---|---|
| evaluation result | test example 1 (water retaining property) | good | fair | bad |
| | test example 2 (lifetime) | good | bad | bad |

FIG.12B

SOLID ELECTROLYTE CAPACITOR AND HOUSING FOR SOLID ELECTROLYTE CAPACITOR

RELATED APPLICATIONS

The present application is a National Phase of International Application Number PCT/JP2014/060040, filed Apr. 4, 2014, and claims priority of Japanese Patent Application No. 2013-079933 filed on Apr. 5, 2013.

TECHNICAL FIELD

The present invention relates to a solid electrolyte capacitor and a housing for a solid electrolyte capacitor.

BACKGROUND ART

Conventionally, there has been known an electrolyte capacitor where an insulating material is disposed between a bottom surface portion of a housing and a capacitor element (see patent literature 1, for example).

FIG. 15A and FIG. 15B are views for explaining a conventional electrolyte capacitor 900. FIG. 15A is a cross-sectional view of the electrolyte capacitor 900, and FIG. 15B is an exploded perspective view of a capacitor element 920. In FIG. 15, symbols 950, 952 indicate lead lines.

As shown in FIG. 15, the conventional electrolyte capacitor 900 includes: a metal-made housing 910 having a bottom surface portion 912, a side surface portion 914 raised from the bottom surface portion 912 and an opening portion 916 formed on an end portion of the side wall portion 914; a capacitor element 920 housed in the inside of the housing 910 and formed by winding an anode foil 922 and a cathode foil 924 in an overlapping manner with a separator 926 interposed therebetween and by filling an electrolyte solution (not shown in the drawing) in between the anode foil 922 and the cathode foil 924; and a sealing member 930 sealing the opening portion 916 of the housing 910 in a state where the capacitor element 920 is housed in the inside of the housing 910, wherein an insulating material 940 is disposed between the bottom surface portion 912 of the housing 910 and the capacitor element 920.

In the conventional electrolyte capacitor 900, an oxide film is formed on a surface (including a surface of an edge portion) of the anode foil 922. The insulating material 940 is made of a resin such as polyethylene, polypropylene or polyolefin.

According to the conventional electrolyte capacitor 900, the insulating material 940 is disposed between the bottom surface portion 912 and the capacitor element 920 and hence, it is possible to provide an electrolyte capacitor which ensures insulating property between the housing 910 and the capacitor element 920.

Further, according to the conventional electrolyte capacitor 900, the insulating material 940 is disposed between the bottom surface portion 912 and the capacitor element 920 and hence, a size of a gap formed between the bottom surface portion 912 and the capacitor element 920 becomes small thus providing an electrolyte capacitor having high vibration resistance.

Further, according to the conventional electrolyte capacitor 900, an electrolyte solution is filled in between the anode foil 922 and the cathode foil 924 and hence, even when a defect occurs in an oxide film on an edge surface of the anode foil where the defect is liable to occur in the oxide film, moisture contained in an electrolyte solution can repair a defective portion of the oxide film. As a result, it is possible to provide an electrolyte capacitor having a high withstand voltage and a small leakage current.

CITATION LIST

Patent Literature

PTL 1: JP-A-2012-44069
PTL 2: JP-A-2010-98131

SUMMARY OF INVENTION

Technical Problem

Recently, in the technical field of capacitors, there has been a demand for a solid electrolyte capacitor having a long lifetime and a low equivalent series resistance (ESR) compared to an electrolyte capacitor using an electrolyte solution. However, in such a solid electrolyte capacitor, an electrolyte solution is not filled in between an anode foil and a cathode foil and hence, even when a defect occurs in an oxide film formed on an edge surface of the anode foil where the defect is liable to occur in the oxide film, a defective portion of the oxide film cannot be repaired. As a result, there exists a drawback that it is difficult to provide a solid electrolyte capacitor having a high withstand voltage and a small leakage current and having a longer lifetime than conventional capacitors.

The present invention has been made to overcome the above-mentioned drawback, and it is an object according to the present invention to provide a solid electrolyte capacitor having a high withstand voltage, a small leakage current and having a longer lifetime than conventional capacitors.

It is another object according to the present invention to provide a housing for a solid electrolyte capacitor used for such a solid electrolyte capacitor.

Solution to Problem

Inventors according to the present invention have made extensive studies to achieve the above-mentioned object and, as a result of the studies, have found that by disposing an insulating material made of a hydrophilic synthetic resin between a bottom surface portion of a housing and a capacitor element and/or between the capacitor element and a sealing member, a solid electrolyte capacitor which contains no electrolyte solution can also repair a defective portion of an oxide film by moisture which the hydrophilic synthetic resin retains.

Based on such finding, the inventors according to the present invention have further made extensive studies, and as a result of the studies, have found that the above-mentioned insulating material made of a hydrophilic synthetic resin should be "oxide film repairing body" having a function of efficiently repairing a defective portion when a defect occurs in an oxide film. As a material which contributes to the repair of the defective portion, water, a substance which can supply an ionic substance (a substance having a functional group which is ionized in water) and oxygen or the like can be named.

For example, when an insulating material made of polyvinyl alcohol (PVA) described in patent literature 2 is used as the above-mentioned insulating material made of a hydrophilic synthetic resin, the insulating material has an ability of retaining and supplying moisture as a function of repairing a defective portion. However, the insulation material cannot expect moisture supply ability to an extent that the defective portion can be repaired for a long period (see test example 1 described later) and hence, the insulation material made of polyvinyl alcohol (PVA) is not suitable for forming an oxide film repairing body for a solid electrolytic capacitor having a longer lifetime than conventional electrolytic capacitors.

In view of the above, the inventors according to the present invention have reached an idea that the above-mentioned drawback can be overcome by disposing an oxide film repairing body made of a hydrophilic synthetic resin between a bottom surface portion of a housing and a capacitor element and/or between the capacitor element and a sealing member, and have completed the present invention.

[1] The present invention is directed to a solid electrolyte capacitor which includes: a bottomed cylindrical housing having a bottom surface portion, a side surface portion raised from the bottom surface portion and an opening portion formed on an end portion of the side surface portion; a capacitor element housed in the inside of the housing, the capacitor element being formed by winding an anode foil and a cathode foil in an overlapping state with a separator interposed therebetween and by filling a solid electrolyte between the anode foil and the cathode foil; and a sealing member sealing the opening portion of the housing in a state where the capacitor element is housed in the inside of the housing, wherein an oxide film repairing body made of a hydrophilic synthetic resin is disposed at least one of between the bottom surface portion of the housing and the capacitor element and between the capacitor element and the sealing member.

According to the solid electrolyte capacitor according to the present invention, the oxide film repairing body made of a hydrophilic synthetic resin is disposed at least one of between the bottom surface portion of the housing and the capacitor element and between the sealing member and the capacitor element. Accordingly, even when a defect occurs in an oxide film on the edge surface of the anode foil or the cathode foil where a defect is liable to occur in the oxide film, a defective portion can be repaired by moisture which the oxide film repairing body retains. As a result, it is possible to provide a solid electrolyte capacitor having a high withstand voltage and a small leakage current, and a longer lifetime than a conventional solid electrolyte capacitor.

In this specification, "hydrophilic synthetic resin" means a synthetic resin containing a hydrophilic functional group in a side chain or a synthetic resin having bonding which exhibits hydrogen bonding in a main chain thereof. Also, in this specification, "oxide film repairing body" means a structural body capable of retaining an amount of moisture with which a defective portion can be repaired when a defect occurs in the oxide film. The content of moisture capable of repairing the defective portion falls within a range of 2 wt % to 40 wt %.

According to the solid electrolyte capacitor according to the present invention, the oxide film repairing body made of a hydrophilic synthetic resin is disposed at least one of between the bottom surface portion of the housing and the capacitor element and between the capacitor element and the sealing member. Accordingly, a size of a gap formed between the bottom surface portion and the capacitor element and/or a size of a gap formed between the capacitor element and the sealing member are/is reduced, and the oxide film repairing body functions as a buffer material and hence, it is possible to provide a solid electrolyte capacitor having high vibration resistance.

According to the solid electrolyte capacitor according to the present invention, the oxide film repairing body made of a hydrophilic synthetic resin is disposed at least one of between the bottom surface portion of the housing and the capacitor element and between the capacitor element and the sealing member and hence, it is possible to provide a solid electrolyte capacitor where sufficient insulating property is ensured between the bottom surface portion and the capacitor element and/or between the capacitor element and the sealing member.

[2] In the solid electrolyte capacitor according to the present invention, it is preferable that the oxide film repairing body be made of a synthetic resin which includes a hydrophilic functional group in a side chain.

With such a configuration, it is possible to provide an oxide film repairing body having high moisture retaining ability and an excellent oxide film repairing function.

[3] In the solid electrolyte capacitor according to the present invention, it is preferable that the hydrophilic functional group be one selected from a group consisting of a phenolic group, a hydroxyphenyl carboxylic acid group, a hydroxyalkyl group, an amino group, a carbonyl group, a carboxyl group, a sulfonic acid group, an amide group and a phosphate ester group.

With such a configuration, a synthetic resin containing the above-mentioned functional group has large polarity so that the synthetic resin and water easily generates hydrogen bonding whereby it is possible to provide an oxide film repairing body having higher moisture retaining ability.

Among the above-mentioned functional groups, a phenolic group is also referred to as a hydroxyphenyl group.

A hydroxyphenyl carboxylic acid group is a functional group where one hydrogen in an aromatic ring of a hydroxyphenyl group is replaced with a carboxyl group, and has the structure corresponding to a hydroxybenzonic acid.

A sulfonic acid group is also referred to as a sulfo group.

[4] In the solid electrolyte capacitor according to the present invention, it is preferable that the hydrophilic functional group be one selected from a group consisting of a phenolic group, a hydroxyphenyl carboxylic acid group, a hydroxyalkyl group, a carboxyl group, a sulfonic acid group and a phosphate ester group.

The above-mentioned functional group easily generates "—O⁻" ion by dissociating H⁺ so that a synthetic resin containing the above-mentioned functional group becomes "ionic substance" and "substance capable of supplying oxygen". Accordingly, with such a configuration, not only a defect of an oxide film can be repaired with moisture which the oxide film repairing body retains but also the oxide film repairing body per se can also repair the defect of the oxide film since the above-mentioned "—O⁻" ion contributes to a reaction with aluminum. As a result, it is possible to provide a solid electrolyte capacitor having a higher oxide film repairing function.

[5] In the solid electrolyte capacitor according to the present invention, it is preferable that the hydrophilic functional group be an amino group.

With such a configuration, the amino group is ionized so that dedoping of a conductive polymer is induced. Accordingly, conductivity of the conductive polymer is remarkably lowered. As a result, it is possible to provide a solid electrolyte capacitor where high insulating property is ensured between the housing and the solid electrolyte.

[6] In the solid electrolyte capacitor according to the present invention, it is preferable that the hydrophilic functional group be one selected from a group consisting of a phenolic group, a hydroxyphenyl carboxylic acid group, a hydroxyalkyl group, an amino group, a carbonyl group, a carboxyl group, an amide group and a phosphate ester group.

With such a configuration, the above-mentioned functional group includes a substance which easily generates an electrophilic addition reaction with a conductive polymer or a substance which easily generates a hydration reaction and hence, a π bonding of a conductive polymer is cut off by the substance which easily generates an electrophilic addition reaction or the substance which easily generates a hydration reaction. Accordingly, conductivity of the conductive polymer is lowered and hence, it is possible to provide a solid electrolyte capacitor where high insulating property is ensured between the housing and the solid electrolyte.

[7] In the solid electrolyte capacitor according to the present invention, it is preferable that the oxide film repairing body be made of a synthetic resin having bonding which exhibits hydrogen bonding in a main chain thereof, and contains 2 wt % or more of moisture.

With such a configuration, it is possible to provide an oxide film repairing body having a high moisture retaining ability and an excellent oxide film repairing function.

The reason the content of moisture contained in the oxide film repairing body is set to 2 wt % or more is that when the content of moisture contained in the oxide film repairing body is less than 2 wt %, the content of moisture retained in the oxide film repairing body is too small to completely repair the defective portion.

[8] In the solid electrolyte capacitor according to the present invention, it is preferable that the bonding which exhibits hydrogen bonding be ether bonding, carbonyl bonding, amide bonding or ester bonding.

With such a configuration, a synthetic resin having the above-mentioned bonding which exhibits hydrogen bonding possesses large polarity so that the synthetic resin and water easily generate hydrogen bonding whereby it is possible to provide an oxide film repairing body having higher moisture retaining ability.

[9] In the solid electrolyte capacitor according to the present invention, it is preferable that the bonding which exhibits hydrogen bonding be carbonyl bonding, amide bonding or ester bonding.

With such a configuration, the above-mentioned bonding which exhibits hydrogen bonding includes a substance which easily generates an electrophilic addition reaction with a conductive polymer or a substance which easily generates a hydration reaction and hence, a π bonding of a conductive polymer is cut off by the substance which easily generates an electrophilic addition reaction or the substance which easily generates a hydration reaction. Accordingly, conductivity of the conductive polymer is lowered and hence, it is possible to provide a solid electrolyte capacitor where high insulating property is ensured between the housing and the solid electrolyte.

[10] In the solid electrolyte capacitor according to the present invention, it is preferable that the oxide film repairing body be disposed between the bottom surface portion and the capacitor element which opposedly faces the bottom surface portion.

A defect is liable to occur in the oxide film at an edge portion of the anode foil on the bottom surface side or an edge portion of the cathode foil on the bottom surface side. Accordingly, with such a configuration, a defective portion can be rapidly repaired by moisture which the oxide film repairing body retains. As a result, it is possible to provide a solid electrolyte capacitor having a high withstand voltage and a small leakage current, and a longer lifetime than a conventional solid electrolyte capacitor.

[11] In the solid electrolyte capacitor according to the present invention, it is preferable that the oxide film repairing body be also arranged between the capacitor element and the sealing member.

A defect is liable to occur in the oxide film at an edge portion of the anode foil on the top surface side or an edge portion of the cathode foil on the top surface side. Accordingly, with such a configuration, a defective portion can be rapidly repaired by moisture which the oxide film repairing body retains. As a result, it is possible to provide a solid electrolyte capacitor having a high withstand voltage and a small leakage current, and a longer lifetime than a conventional solid electrolyte capacitor.

Further, with such a configuration, even when the sealing member has conductivity due to added carbon or the like, compared to a case where the oxide film repairing body is not arranged, it is possible to provide a solid electrolyte capacitor where sufficient insulating property is ensured between the sealing member and the capacitor element.

[12] In the solid electrolyte capacitor according to the present invention, it is preferable that the oxide film repairing body be also arranged between the side surface portion and the capacitor element.

With such a configuration, the oxide film repairing body arranged between the side surface portion and the capacitor element also retains moisture and hence, the solid electrolyte capacitor is brought into a state where a concentration of water vapor in the whole housing is high. As a result, the oxide film repairing body arranged between the bottom surface portion of the housing and the capacitor element (and between the sealing member and the capacitor element) can easily retain moisture.

With such a configuration, a size of a gap formed between the side surface portion of the housing and the capacitor element is reduced, and the oxide film repairing body functions as a buffer material and hence, it is possible to provide a solid electrolyte capacitor having high vibration resistance.

With such a configuration, it is possible to provide a solid electrolyte capacitor where sufficient insulating property is ensured between the side surface portion of the housing and the capacitor element.

[13] The present invention is directed to a housing for a solid electrolyte capacitor having a bottomed cylindrical shape for housing the solid electrolyte capacitor, the housing including: a bottom surface portion; a side surface portion raised from the bottom surface portion; and an opening portion formed on an end portion of the side surface, wherein an oxide film repairing body made of a hydrophilic synthetic resin is formed on an inner surface of the bottom surface portion.

According to the housing for a solid electrolyte capacitor according to the present invention, the oxide film repairing body made of a hydrophilic synthetic resin is formed on the inner surface of the bottom surface portion. Accordingly, even when a defect occurs in an oxide film on the edge surface of the anode foil or the cathode foil where a defect is liable to occur in the oxide film, the defective portion can be repaired by moisture which the oxide film repairing body retains. As a result, it is possible to manufacture a solid electrolyte capacitor having a high withstand voltage and a small leakage current, and a longer lifetime than a conventional solid electrolyte capacitor.

According to the housing for a solid electrolyte capacitor according to the present invention, the oxide film repairing body made of a hydrophilic synthetic resin is formed on the inner surface of the bottom surface portion. Accordingly, in the manufactured solid electrolyte capacitor, a size of a gap formed between the bottom surface portion and the capacitor element is reduced, and the oxide film repairing body functions as a buffer material and hence, it is possible to manufacture a solid electrolyte capacitor having high vibration resistance.

According to the housing for a solid electrolyte capacitor according to the present invention, the oxide film repairing body made of a hydrophilic synthetic resin is formed on the inner surface of the bottom surface portion and hence, it is possible to manufacture a solid electrolyte capacitor where sufficient insulating property is ensured between the bottom surface portion of the housing and the capacitor element.

[14] In the housing for a solid electrolyte capacitor according to the present invention, the oxide film repairing body made of a hydrophilic synthetic resin be also formed on an inner surface of the side surface portion.

With such a configuration, the oxide film repairing body formed on the inner surface of the side surface portion also retains moisture. Accordingly, the manufactured solid electrolyte capacitor is brought into a state where a concentration of water vapor in the whole housing is high. As a result, it is possible to manufacture a solid electrolyte capacitor where the oxide film repairing body arranged on the inner surface of the bottom surface portion can easily retain moisture.

With such a configuration, it is possible to manufacture a solid electrolyte capacitor where sufficient insulating property is ensured between the side surface portion and the capacitor element.

With such a configuration, a size of a gap formed between the side surface portion and the capacitor element is reduced, and the oxide film repairing body functions as a buffer material and hence, it is possible to manufacture a solid electrolyte capacitor having high vibration resistance.

BRIEF DESCRIPTION OF DRAWINGS

FIG. 1A and FIG. 1B are views for explaining a solid electrolyte capacitor of an embodiment 1.

FIG. 5A and FIG. 5B are views for explaining a solid electrolyte capacitor of an embodiment 4.

FIG. 12A and FIG. 12B are tables showing data on respective specimens used in test examples and evaluation results of the test examples.

DESCRIPTION OF PREFERRED EMBODIMENTS

Figure 2:
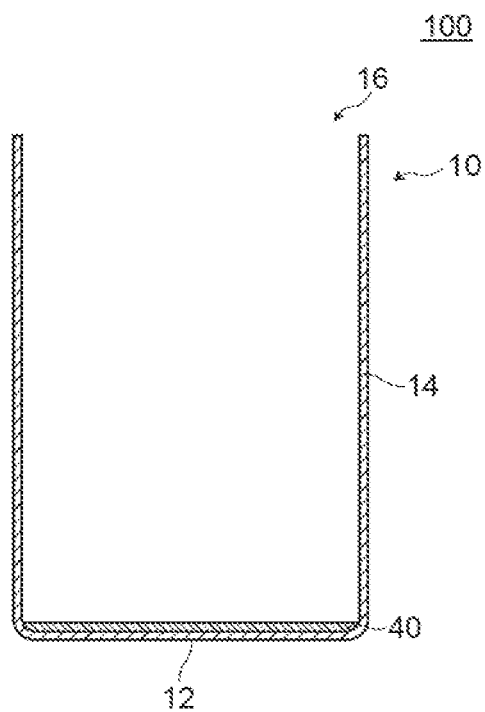
FIG. 2 is a view for explaining a housing for a solid electrolyte capacitor of the embodiment 1.

Hereinafter, a solid electrolyte capacitor and a housing for a solid electrolyte capacitor according to the present invention are explained based on embodiments shown in the drawings.

Embodiment 1

1. Configuration of Solid Electrolyte Capacitor 1 of Embodiment 1

Firstly, the configuration of a solid electrolyte capacitor 1 of an embodiment 1 is explained together with the configuration of a housing for a solid electrolyte capacitor 100 in the embodiment 1.

FIG. 1A and FIG. 1B are views for explaining the solid electrolyte capacitor 1 of the embodiment 1. FIG. 1A is a cross-sectional view of the solid electrolyte capacitor 1, and FIG. 1B is an exploded perspective view of a capacitor element 20.

FIG. 2 is a view for explaining the housing for a solid electrolyte capacitor 100 in the embodiment 1.

The solid electrolyte capacitor 1 of the embodiment 1 is a winding-type solid electrolyte capacitor. As shown in FIG. 1A, the solid electrolyte capacitor 1 includes: a bottomed cylindrical housing 10; the capacitor element 20; and a sealing member 30. An oxide film repairing body 40 made of a hydrophilic synthetic resin is disposed between a bottom surface portion 12 of the housing 10 and the capacitor element 20.

The housing 10 is a bottomed cylindrical case which includes: the bottom surface portion 12; and a side surface portion 14 raised from the bottom surface portion 12, and has an opening portion 16 formed on an end portion of the side surface portion 14. The housing 10 is a case made of metal (aluminum, for example).

A planar shape of the bottom surface portion 12 is an approximately circular shape. An explosion-proof valve (not shown in the drawing) is mounted on the bottom surface portion 12 in the vicinity of a center portion of the bottom surface portion 12. The explosion-proof valve is configured such that when a temperature in the inside of the housing 10 is increased to an abnormally high temperature so that a pressure in the inside of the housing 10 is increased, the explosion-proof valve is broken for releasing the pressure in the inside of the housing 10 to the outside thus preventing a rupture of the housing 10. The side surface portion 14 is raised approximately vertically from an outer edge of the bottom surface portion 12. The opening portion 16 is sealed by the sealing member 30 described later.

The capacitor element 20 is accommodated in the inside of the housing 10. As shown in FIG. 1B, an anode foil 22 and a cathode foil 24 are wound in an overlapping state with a separator 26 interposed therebetween, and a space formed between the anode foil 22 and the cathode foil 24 is filled with a solid electrolyte.

The anode foil 22 is made of valve metal such as aluminum, tantalum or niobium. After a surface (including a surface of the edge portion) of the anode foil 22 is roughened by an etching treatment, an oxide film (not shown in the drawing) is formed on the surface of the anode foil 22 by a chemical conversion treatment. In the same manner as the anode foil 22, the cathode foil 24 is also made of valve metal such as aluminum, tantalum or niobium. After a surface (including a surface of the edge portion) of the cathode foil 24 is roughened by an etching treatment in the same manner as the anode foil 22, an oxide film (not shown in the drawing) is formed on the surface of the cathode foil 24 by natural oxidation. The anode foil 22 is electrically connected with the lead line 50, and the cathode foil 24 is electrically connected with the lead line 52.

The separator 26 is a sheet having a heat resistance property and is formed such that a solid electrolyte is adhered to a surface of the separator 26. A width of the separator 26 is set larger than winding widths of the anode foil 22 and the cathode foil 24. The separator 26 may be made of heat resistant cellulose paper or heat resistant flameproof paper.

The solid electrolyte contains a conductive polymer and a specified stabilizing substance. In this embodiment, PEDOT (polyethylenedioxythiophene) is used as the conductive polymer. However, besides PEDOT, other suitable materials such as polythiophene other than PEDOT, other conductive polymer particles or a charge-transfer complex (TCNQ complex or the like) may be used. The specified stabilizing substance forms a dopant to be added to the conductive polymer. Although a polystyrene sulfonic acid (PSS) is used as the specified stabilizing substance, other suitable materials may also be used besides polystyrene sulfonic acid (PSS). PEDOT is doped with a polystyrene sulfonic acid (PSS) and hence, PEDOT is brought into a polaron state where high conductivity is maintained.

The capacitor element 20 can be prepared in the following manner. Firstly, the surface of the anode foil 22 and the surface of the cathode foil 24 are roughened by an etching treatment, and an oxide film is formed on the surface of the anode foil 22 and an oxide film is formed on the surface of the cathode foil 24. Then, the anode foil 22 and the cathode foil 24 are wound in an overlapping state with the separator 26 interposed therebetween and, thereafter, a chemical conversion treatment is performed by immersing a wound body formed of the anode foil 22, the cathode foil 24 and the separator 26 in a chemical conversion liquid. By immersing the wound body in the chemical conversion liquid, a defective portion of the oxide film which may be present on the surface of the anode foil 22 or on the surface of the cathode foil 24 is repaired in a process of preparing the capacitor element 20. Next, a solid electrolyte is filled in between the anode foil 22 and the cathode foil 24. The capacitor element 20 can be prepared as described above.

In the capacitor element 20, the lead line 50 is connected to the anode foil 22 and the lead line 52 is connected to the cathode foil 24. The lead lines 50, 52 extend to the outside of the capacitor element 20, and the lead line 50 forms an anode terminal of the solid electrolyte capacitor 1 and the lead line 52 forms a cathode terminal of the solid electrolyte capacitor 1.

The sealing member 30 seals the opening portion 16 of the housing 10 in a state where the capacitor element 20 is accommodated in the inside of the housing 10. The sealing member 30 is made of a material prepared by adding an inorganic matter or carbon to polymer having high elasticity and high insulating property such as rubber or thermoplastic elastomer, for example. Through holes are formed in the sealing member 30. The lead lines 50, 52 pulled out from the capacitor element 20 pass through the through holes respectively.

The oxide film repairing body 40 is made of a hydrophilic synthetic resin, and is a constitutional member which can retain an amount of moisture with which a defective portion can be repaired when a defect occurs in the oxide film. The oxide film repairing body 40 is formed on the whole inner surface of the bottom surface portion 12, and is disposed between the bottom surface portion 12 and the capacitor element 20 which faces the bottom surface portion 12 in an opposed manner. A volume resistivity of the oxide film repairing body is 1 kΩcm or more, and is set to 15 kΩcm, for example. A thickness of the oxide film repairing body 40 is set to a value which falls within a range of 1 μm to 200 μm, and is set to 20 μm, for example.

The reason the thickness of the oxide film repairing body is set to 1 μm or more is as follows. When the thickness of the oxide film repairing body is 1 μm or more, not only that sufficient insulating property can be ensured between the capacitor element 20 and the housing 10 but also that even when a pressure in the inside of the solid electrolyte capacitor 1 is increased by any chance and the solid electrolyte capacitor ruptures, scattering of parts in the inside of the solid electrolyte capacitor to the periphery of the solid electrolyte capacitor can be prevented by the oxide film repairing body 40. On the other hand, the reason the thickness of the oxide film repairing body 40 is set to 200 μm or less is that when the thickness of the oxide film repairing body 40 is 200 μm or less, it is possible to provide a solid electrolyte capacitor which can satisfy a demand for the miniaturization. From the above-mentioned viewpoints, the thickness of the oxide film repairing body 40 is preferably set to a value which falls within a range of 10 μm to 150 μm.

The oxide film repairing body 40 is made of a synthetic resin containing a hydrophilic functional group in a side chain. To be more specific, polyacrylamide (PAM) containing an amide group in a side chain is used. Polyacrylamide (PAM) also has an advantage of possessing an excellent film forming property.

As the oxide film repairing body 40, an oxide film repairing body made of a synthetic resin containing an amide group in a side chain besides polyacrylamide (PAM) may be used, or an oxide film repairing body made of a synthetic resin containing a hydrophilic functional group other than an amide group in a side chain. Such a hydrophilic functional group may preferably be a phenolic group, a hydroxyphenyl carboxylic acid group, a hydroxyalkyl group, an amino group, a carbonyl group, a carboxyl group, a sulfonic acid group or a phosphate ester group. When the hydrophilic functional group is a phenolic group, a hydroxyphenyl carboxylic acid group, a hydroxyalkyl group, an amino group, a carbonyl group, a carboxyl group, an amide group or a phosphate ester group, it is also possible to acquire an advantageous effect that insulating property can be enhanced by cutting off a π bonding of a conductive polymer.

An oxide film repairing body which is formed in advance may be used as the oxide film repairing body 40 or, as described later, the oxide film repairing body 40 may be made of a synthetic resin which is a raw material.

The housing 10 and the oxide film repairing body 40 form the housing for a solid electrolyte capacitor 100 in the embodiment 1 (see FIG. 2). The housing for a solid electrolyte capacitor 100 has a bottomed cylindrical shape for housing the solid electrolyte capacitor and, as described above, includes: the bottom surface portion 12; and the side surface portion 14 raised from the bottom surface portion 12, and has the opening portion 16 formed on the end portion of the side surface portion 14. The oxide film repairing body 40 made of a hydrophilic synthetic resin is disposed on the inner surface of the bottom surface portion 12 of the housing 10. In the housing for a solid electrolyte capacitor 100, as described above, a volume resistivity of the oxide film repairing body is 1 kΩcm or more.

2. Method of Manufacturing Solid Electrolyte Capacitor of Embodiment 1

Figure 3:
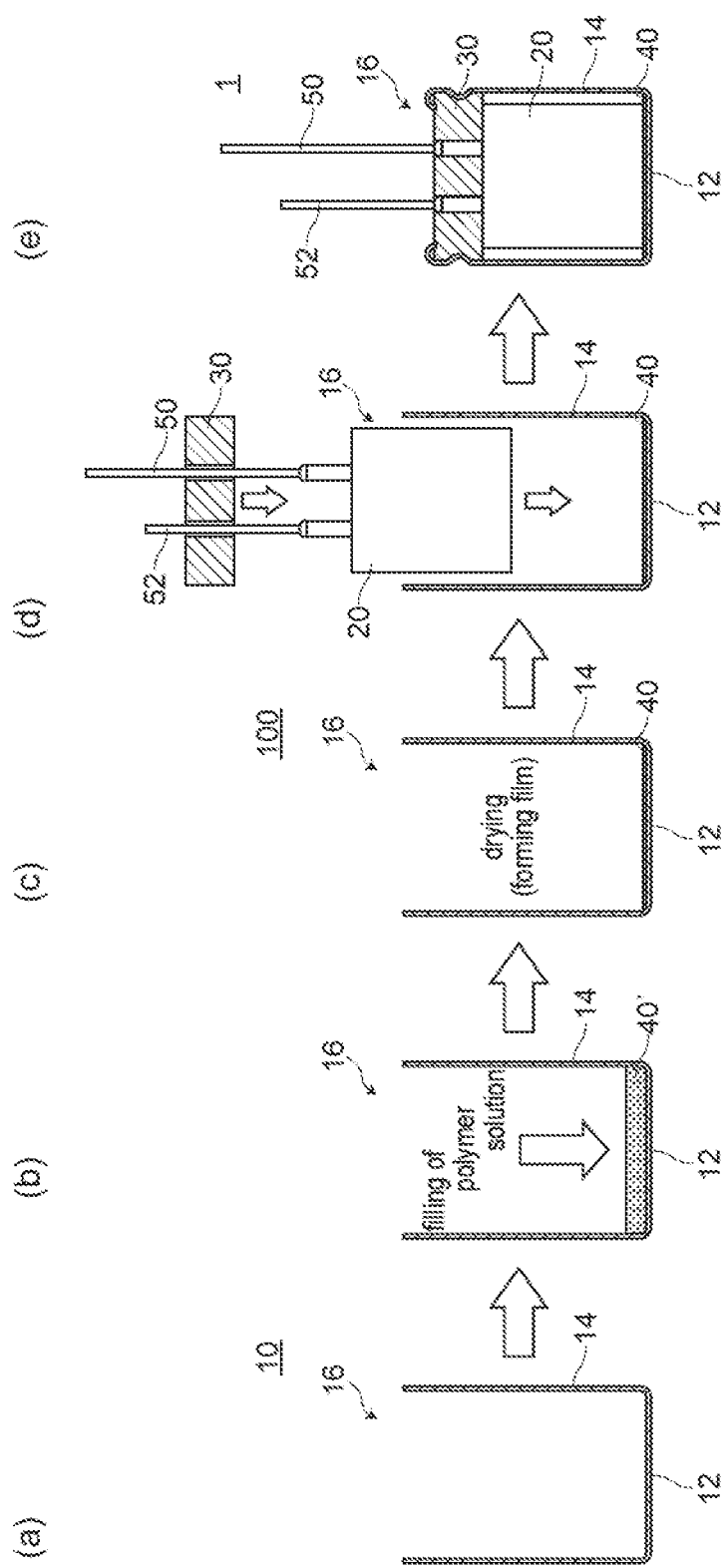
FIG. 3 is a view for explaining a method of manufacturing the solid electrolyte capacitor of the embodiment 1.

FIG. 3 is a view for explaining the method of manufacturing the solid electrolyte capacitor of the embodiment 1. FIG. 3(a) to FIG. 3(e) are views showing respective steps.

Firstly, the housing 10 is prepared (see FIG. 3(a)), and a polymer solution 40' which is a material used for forming a hydrophilic synthetic resin is filled in the inside of the housing 10 (see FIG. 3(b)). The polymer solution 40' may be a solution made of a hydrophilic synthetic resin, or may be a solution where a hydrophilic synthetic resin is dispersed. Next, the polymer solution 40' is dried together with the housing 10 to an extent that the polymer solution 40' is not completely dried thus forming the oxide film repairing body 40 (see FIG. 3(c)). A drying temperature is set to 110° C., for example, and a drying time is set to 20 minutes, for example.

As described above, in the case where the oxide film repairing body 40 is formed by filling the polymer solution 40' in the inside of the housing 10, even when a shape or a size of the bottom surface portion 12 of the housing 10 changes, a shape of the oxide film repairing body can be easily changed and, further, it is unnecessary to change a jig for placing the oxide film repairing body on the bottom surface portion. It is also possible to acquire an advantageous effect that a thin oxide film repairing body can be formed by adjusting a filling amount of the polymer solution 40'.

In this manner, the housing for a solid electrolyte capacitor 100 of the embodiment 1 formed of the housing 10 and the oxide film repairing body 40 is acquired (see FIG. 2 and FIG. 3(c)).

Next, the sealing member 30 is mounted on the capacitor element 20, and the capacitor element 20 is inserted into the housing 10. Thereafter, the housing 10 is caulked in the vicinity of an opening end of the housing 10 (see FIG. 3(d) and FIG. 3(e)).

Next, an aging step is performed by applying a predetermined voltage to the capacitor element 20 under a high temperature atmosphere. The solid electrolyte capacitor 1 in the embodiment 1 can be manufactured in accordance with the above-mentioned steps.

3. Oxide Film Repairing Function of Solid Electrolyte Capacitor 1

Next, an oxide film repairing function in the solid electrolyte capacitor 1 is explained.

On an edge surface of the anode foil 22 and an edge surface of the cathode foil 24, there may be a case where a defect occurs in an oxide film when the capacitor element 20 is accommodated in the housing 10 or when an impact or heat (for example, heat at the time of mounting the capacitor element 20 on a printed circuit board using soldering) is applied to the capacitor element 20 from the outside.

In such a case, in the vicinity of the edge surface of the anode foil 22, aluminum which is exposed due to a defect generated in the oxide film and moisture supplied from the oxide film repairing body 40 react with each other as follows so that a defective portion of the oxide film is repaired by itself.

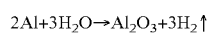

Also in the cathode foil 24, aluminum which is exposed due to a defect generated in the oxide film and moisture supplied from the oxide film repairing body 40 react with each other as follows so that a defective portion of the oxide film is repaired by itself.

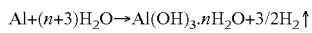

4. Advantageous Effects of Solid Electrolyte Capacitor 1 of Embodiment 1 and Housing for a Solid Electrolyte Capacitor 100 of Embodiment 1

According to the solid electrolyte capacitor 1 of the embodiment 1, the oxide film repairing body 40 made of a hydrophilic synthetic resin is disposed between the bottom surface portion 12 of the housing 10 and the capacitor element 20. Accordingly, even when a defect occurs in an oxide film on the edge surface of the anode foil 22 or the cathode foil 24 where a defect is liable to occur in the oxide film, the defective portion can be repaired by moisture which the oxide film repairing body 40 retains. As a result, it is possible to provide a solid electrolyte capacitor having a high withstand voltage and a small leakage current, and a longer lifetime than a conventional solid electrolyte capacitor.

According to the solid electrolyte capacitor 1 of the embodiment 1, the oxide film repairing body 40 made of a hydrophilic synthetic resin is disposed between the bottom surface portion 12 of the housing 10 and the capacitor element 20 and hence, a size of a gap formed between the bottom surface portion 12 and the capacitor element 20 is reduced, and the oxide film repairing body 40 functions as a buffer material whereby it is possible to provide a solid electrolyte capacitor having high vibration resistance.

According to the solid electrolyte capacitor 1 of the embodiment 1, between the bottom surface portion 12 of the housing 10 and the capacitor element 20, the oxide film repairing body 40 made of a hydrophilic synthetic resin is disposed. Accordingly, it is possible to provide a solid electrolyte capacitor where sufficient insulating property is ensured between the bottom surface portion 12 and the capacitor element 20.

According to the solid electrolyte capacitor 1 of the embodiment 1, the oxide film repairing body 40 is made of a synthetic resin containing a hydrophilic functional group in a side chain and hence, it is possible to provide an oxide film repairing body having a high moisture retaining ability and an excellent oxide film repairing function.

According to the solid electrolyte capacitor 1 of the embodiment 1, a synthetic resin containing an amino group, a carbonyl group, a carboxyl group, a sulfonic acid group, an amide group or a phosphate ester group possesses large polarity so that the synthetic resin and water easily generates hydrogen bonding whereby it is possible to provide an oxide film repairing body having higher moisture retaining ability.

According to the solid electrolyte capacitor 1 of the embodiment 1, a phenolic group, a hydroxyphenyl carboxylic acid group, a hydroxyalkyl group, an amino group, a carbonyl group, a carboxyl group, an amide group or a phosphate ester group includes a substance which easily generates an electrophilic addition reaction with a conductive polymer or a substance which easily generates a hydration reaction and hence, a π bonding of a conductive polymer is cut off by the substance which easily generates an electrophilic addition reaction or the substance which easily generates a hydration reaction. Accordingly, conductivity of the conductive polymer is lowered and hence, it is possible to provide a solid electrolyte capacitor where high insulating property is ensured between the housing 10 and the solid electrolyte.

According to the solid electrolyte capacitor 1 of the embodiment 1, a volume resistivity of the oxide film repairing body 40 is 1 kΩcm or more and hence, it is possible to provide a solid electrolyte capacitor where sufficient insulating property is ensured between the capacitor element 20 and the housing 10.

A defect is liable to occur in the oxide film at an edge portion of the anode foil 22 on a bottom surface side or an edge portion of the cathode foil 24 on a bottom surface side. According to the solid electrolyte capacitor 1 of the embodiment 1, a defective portion can be rapidly repaired by moisture which the oxide film repairing body 40 retains. As a result, it is possible to provide a solid electrolyte capacitor having a high withstand voltage and a small leakage current, and a longer lifetime than a conventional solid electrolyte capacitor.

According to the solid electrolyte capacitor 1 of the embodiment 1, even when irregularities are formed on the end surface of the capacitor element 20 on a bottom surface side, the oxide film repairing body 40 can be arranged between the bottom surface portion 12 of the housing 10 and the capacitor element 20.

According to the solid electrolyte capacitor 1 of the embodiment 1, the oxide film repairing body 40 is formed on a whole inner surface of the bottom surface portion 12 and hence, compared to a case where the oxide film repairing body 40 is formed only on a portion of the bottom surface portion 12, an amount of moisture in the inside of the housing 10 can be increased. Accordingly, the oxide film repairing body 40 can easily retain moisture and hence, the defective portion can be repaired by moisture which the oxide film repairing body 40 retains.

According to the housing for a solid electrolyte capacitor 100 of the embodiment 1, the oxide film repairing body 40 made of a hydrophilic synthetic resin is formed on the inner surface of the bottom surface portion 12. Accordingly, even when a defect occurs in an oxide film on the edge surface of the anode foil 22 or the cathode foil 24 where a defect is liable to occur in the oxide film, the defective portion can be repaired by moisture which the oxide film repairing body 40 retains. As a result, it is possible to provide a solid electrolyte capacitor having a high withstand voltage and a small leakage current, and a longer lifetime than a conventional solid electrolyte capacitor.

According to the housing for a solid electrolyte capacitor 100 of the embodiment 1, the oxide film repairing body 40 made of a hydrophilic synthetic resin is formed on the inner surface of the bottom surface portion 12. Accordingly, in the manufactured solid electrolyte capacitor, a size of a gap formed between the bottom surface portion 12 and the capacitor element 20 is reduced, and the oxide film repairing body 40 functions as a buffer material and hence, it is possible to manufacture a solid electrolyte capacitor having high vibration resistance.

According to the housing for a solid electrolyte capacitor 100 of the embodiment 1, the oxide film repairing body 40 made of a hydrophilic synthetic resin is disposed on the inner surface of the bottom surface portion 12 and hence, it is possible to manufacture a solid electrolyte capacitor where sufficient insulating property is ensured in a gap formed between the bottom surface portion 12 and the capacitor element 20.

According to the housing for a solid electrolyte capacitor 100 of the embodiment 1, a volume resistivity of the oxide film repairing body 40 is 1 kΩcm or more and hence, it is possible to manufacture a solid electrolyte capacitor where sufficient insulating property is ensured between the housing 10 and the capacitor element 20.

[Modification 1]

In a solid electrolyte capacitor (not shown in the drawing) of a modification 1, an oxide film repairing body made of a synthetic resin containing an amino group in a side chain is used. In this manner, even when the oxide film repairing body made of a synthetic resin containing an amino group in a side chain is used, in the same manner as the solid electrolyte capacitor 1 of the embodiment 1, the oxide film repairing body made of a hydrophilic synthetic resin is disposed between the bottom surface portion of the housing and the capacitor element. Accordingly, even when a defect occurs in an oxide film on the edge surface of the anode foil or the cathode foil where a defect is liable to occur in the oxide film, the defective portion can be repaired by moisture which the oxide film repairing body retains. As a result, it is possible to provide a solid electrolyte capacitor having a high withstand voltage and a small leakage current, and a longer lifetime than a conventional solid electrolyte capacitor.

According to the solid electrolyte capacitor of the modification 1, the amino group is ionized so that dedoping of a conductive polymer is induced. Accordingly, conductivity of the conductive polymer is remarkably lowered. As a result, it is possible to provide a solid electrolyte capacitor where high insulating property is ensured between the housing 10 and the solid electrolyte.

[Modification 2]

In a solid electrolyte capacitor (not shown in the drawing) of a modification 2, an oxide film repairing body made of a synthetic resin containing a phenolic group, a hydroxyphenyl carboxylic acid group, a hydroxyalkyl group, a carboxyl group, a sulfonic acid group or a phosphate ester group in a side chain is used. In this manner, even when the oxide film repairing body made of a synthetic resin containing the above-mentioned functional group in a side chain is used, in the same manner as the solid electrolyte capacitor 1 of the embodiment 1, the oxide film repairing body made of a hydrophilic synthetic resin is disposed between the bottom surface portion of the housing and the capacitor element. Accordingly, even when a defect occurs in an oxide film on the edge surface of the anode foil or the cathode foil where a defect is liable to occur in the oxide film, the defective portion can be repaired by moisture which the oxide film repairing body retains. As a result, it is possible to provide a solid electrolyte capacitor having a high withstand voltage and a small leakage current, and a longer lifetime than a conventional solid electrolyte capacitor.

The above-mentioned functional group easily generates "—O$^-$" ion by dissociating H$^+$ so that a synthetic resin containing the above-mentioned functional group becomes "ionic substance" and "substance capable of supplying oxygen". According to the solid electrolyte capacitor of the modification 2, not only a defect of an oxide film can be repaired with moisture which the oxide film repairing body retains but also the oxide film repairing body per se can also repair the defect of the oxide film since the above-mentioned "—O$^-$" ion contributes to a reaction with aluminum. As a result, it is possible to provide a solid electrolyte capacitor having a higher oxide film repairing function.

Embodiment 2

A solid electrolyte capacitor of an embodiment 2 (not shown in the drawing) basically has substantially the same configuration as the solid electrolyte capacitor 1 of the embodiment 1. However, the solid electrolyte capacitor of the embodiment 2 differs from the solid electrolyte capacitor 1 of the embodiment 1 with respect to a kind of hydrophilic synthetic resin for forming the oxide film repairing body. That is, in the solid electrolyte capacitor of the embodiment 2, the oxide film repairing body is made of a synthetic resin having bonding which exhibits hydrogen bonding in a main chain. The oxide film repairing body contains 2 wt % or more of moisture.

As the oxide film repairing body, an oxide film repairing body made of a synthetic resin having ether bonding, carbonyl bonding, amide bonding or ester bonding in a main chain is used. As such a synthetic resin, hydroxyethyl cellulose can be used, for example.

As described above, although the solid electrolyte capacitor of the embodiment 2 differs from the solid electrolyte capacitor 1 of the embodiment 1 with respect to the kind of synthetic resin for forming the oxide film repairing body, in the same manner as the solid electrolyte capacitor 1 of the embodiment 1, the oxide film repairing body made of a hydrophilic synthetic resin is disposed between the bottom surface portion of the housing and the capacitor element. Accordingly, even when a defect occurs in an oxide film on the edge surface of the anode foil or the cathode foil where a defect is liable to occur in the oxide film, the defective portion can be repaired by moisture which the oxide film repairing body retains. As a result, it is possible to provide a solid electrolyte capacitor having a high withstand voltage and a small leakage current, and a longer lifetime than a conventional solid electrolyte capacitor.

According to the solid electrolyte capacitor of the embodiment 2, the oxide film repairing body made of a hydrophilic synthetic resin is disposed between the bottom surface portion of the housing and the capacitor element and hence, a size of a gap formed between the bottom surface portion and the capacitor element is reduced, and the oxide film repairing body functions as a buffer material whereby it is possible to provide a solid electrolyte capacitor having high vibration resistance.

According to the solid electrolyte capacitor of the embodiment 2, the oxide film repairing body made of a hydrophilic synthetic resin is disposed between the bottom surface portion of the housing and the capacitor element and hence, it is possible to provide a solid electrolyte capacitor where sufficient insulating property is ensured between the bottom surface portion and the capacitor element.

According to the solid electrolyte capacitor of the embodiment 2, it is possible to provide an oxide film repairing body having high moisture retaining ability and an excellent oxide film repairing function.

The reason the oxide film repairing body contains 2 wt % or more of moisture is that when the oxide film repairing body contains less than 2 wt % of moisture, an amount of moisture which the oxide film repairing body retains is too small to completely repair the defective portion.

According to the solid electrolyte capacitor of the embodiment 2, a synthetic resin having ether bonding, carbonyl bonding, amide bonding or ester bonding exhibits large polarity so that the synthetic resin and water easily generates hydrogen bonding whereby it is possible to provide an oxide film repairing body having higher moisture retaining ability.

According to the solid electrolyte capacitor of the embodiment 2, carbonyl bonding, amide bonding or ester bonding includes a substance which easily generates an electrophilic addition reaction with a conductive polymer or a substance which easily generates a hydration reaction and hence, a $\pi$ bonding of a conductive polymer is cut off by the substance which easily generates an electrophilic addition reaction or the substance which easily generates a hydration reaction. Accordingly, conductivity of the conductive polymer is lowered and hence, it is possible to provide a solid electrolyte capacitor where high insulating property is ensured between the housing and the solid electrolyte.

The solid electrolyte capacitor of the embodiment 2 has substantially the same configuration as the solid electrolyte capacitor 1 of the embodiment 1 except for a kind of synthetic resin for forming the oxide film repairing body and hence, the solid electrolyte capacitor of the embodiment 2 has advantageous effects acquired by the corresponding configurations of the solid electrolyte capacitor 1 of the embodiment 1 among advantageous effects which the solid electrolyte capacitor 1 of the embodiment 1 possesses.

Embodiment 3

Figure 4:
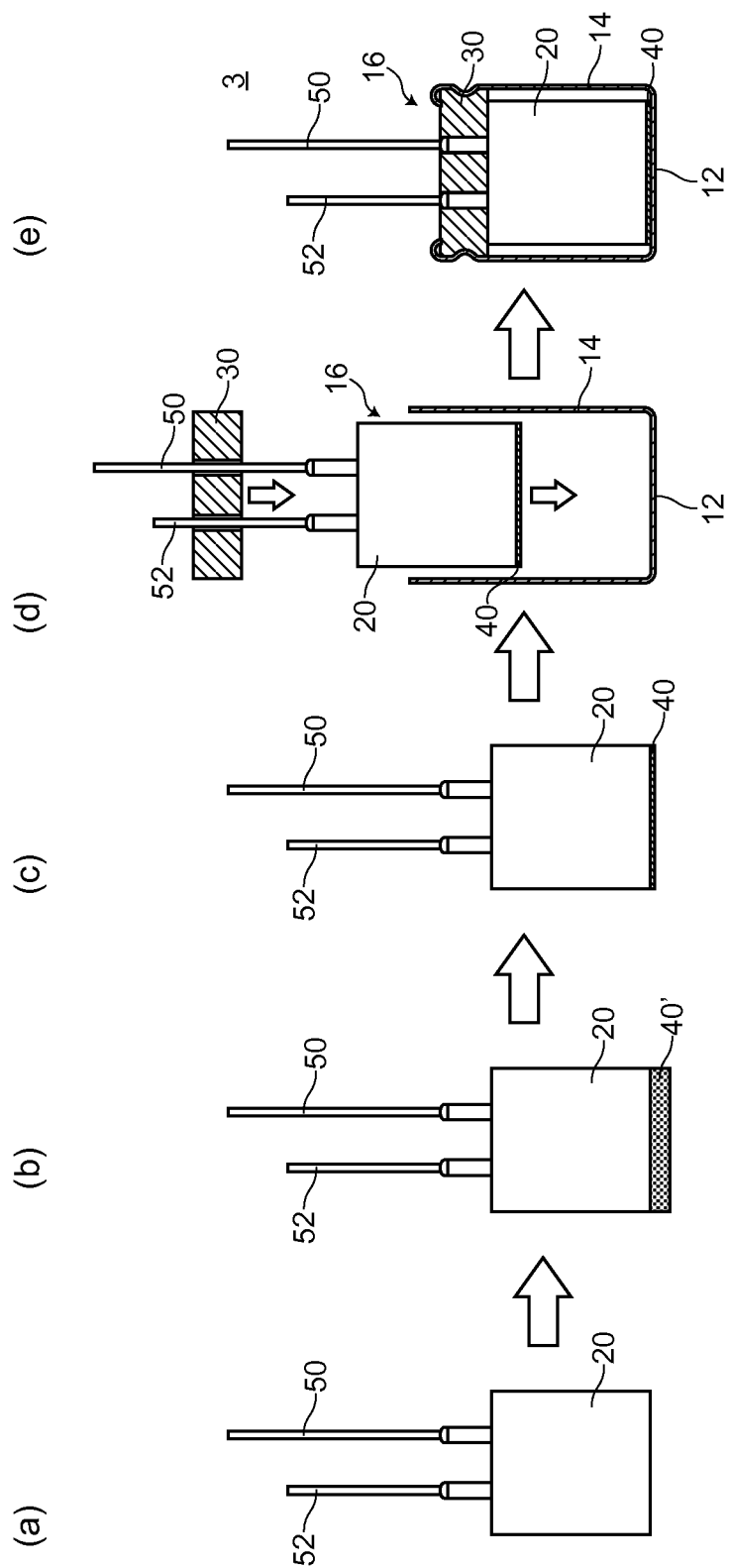
FIG. 4 is a view for explaining a method of manufacturing a solid electrolyte capacitor of an embodiment 3.

FIG. 4 is a view for explaining the method of manufacturing a solid electrolyte capacitor of an embodiment 3. FIG. 4(a) to FIG. 4(e) are views showing respective steps.

The solid electrolyte capacitor 3 of the embodiment 3 basically has substantially the same configuration as the solid electrolyte capacitor 1 of the embodiment 1. However, the solid electrolyte capacitor 3 of the embodiment 3 differs from the solid electrolyte capacitor 1 of the embodiment 1 with respect to a position where the oxide film repairing body is disposed. That is, in the solid electrolyte capacitor 3 of the embodiment 3, as shown in FIG. 4, the oxide film repairing body 40 is formed on an end surface of the capacitor element 20 on the bottom surface side.

In the embodiment 3, the oxide film repairing body 40 is formed as follows. Firstly, the capacitor element 20 is prepared (see FIG. 4(a)), and a polymer solution 40' made of a hydrophilic synthetic resin is adhered to an end surface of the capacitor element 20 on the bottom surface side (see FIG. 4(b)). Thereafter, a film is formed by drying the polymer solution 40' to an extent that moisture in the polymer solution 40' is not completely dried thus forming the oxide film repairing body 40 (see FIG. 4(c)). The subsequent steps are substantially the same as the corresponding steps in the method of manufacturing the solid electrolyte capacitor of the embodiment 1 and hence, the explanation of such steps is omitted (see FIG. 4(d) and FIG. 4(e)).

As described above, the solid electrolyte capacitor 3 of the embodiment 3 differs from the solid electrolyte capacitor 1 of the embodiment 1 with respect to the position where the oxide film repairing body is disposed. However, in the same manner as the solid electrolyte capacitor 1 of the embodiment 1, the oxide film repairing body 40 made of a hydrophilic synthetic resin is disposed between the bottom surface portion 12 of the housing 10 and the capacitor element 20. Accordingly, even when a defect occurs in an oxide film on the edge surface of the anode foil 22 or the cathode foil 24 where a defect is liable to occur in the oxide film, the defective portion can be repaired by moisture which the oxide film repairing body 40 retains. As a result, it is possible to provide a solid electrolyte capacitor having a high withstand voltage and a small leakage current, and a longer lifetime than a conventional solid electrolyte capacitor.

According to the solid electrolyte capacitor 3 of the embodiment 3, the oxide film repairing body 40 made of a hydrophilic synthetic resin is disposed between the bottom surface portion 12 of the housing 10 and the capacitor element 20 and hence, a size of a gap formed between the bottom surface portion 12 and the capacitor element 20 is reduced, and the oxide film repairing body functions as a buffer material whereby it is possible to provide a solid electrolyte capacitor having high vibration resistance.

According to the solid electrolyte capacitor 3 of the embodiment 3, the oxide film repairing body 40 made of a hydrophilic synthetic resin is disposed between the bottom surface portion 12 of the housing 10 and the capacitor element 20 and hence, it is possible to provide a solid electrolyte capacitor where sufficient insulating property is ensured between the bottom surface portion 12 and the capacitor element 20.

A defect is liable to occur in the oxide film at an edge portion of the anode foil 22 on the bottom surface side or an edge portion of the cathode foil 24 on a bottom surface side. According to the solid electrolyte capacitor 3 of the embodiment 3, with such a configuration, the defective portion can be rapidly repaired by moisture which the oxide film repairing body 40 retains. As a result, it is possible to provide a solid electrolyte capacitor having a high withstand voltage and a small leakage current, and a longer lifetime than a conventional solid electrolyte capacitor.

The solid electrolyte capacitor 3 of the embodiment 3 has substantially the same configuration as the solid electrolyte capacitor 1 of the embodiment 1 except for a position where the oxide film repairing body is disposed and hence, the solid electrolyte capacitor 3 of the embodiment 3 has advantageous effects acquired by the corresponding configurations of the solid electrolyte capacitor 1 of the embodiment 1 among advantageous effects which the solid electrolyte capacitor 1 of the embodiment 1 possesses.

Embodiment 4

FIG. 5A and FIG. 5B are views for explaining a solid electrolyte capacitor 4 of an embodiment 4. FIG. 5A is a cross-sectional view of the solid electrolyte capacitor 4, and FIG. 5B is an exploded perspective view of a capacitor element 20.

Figure 6:
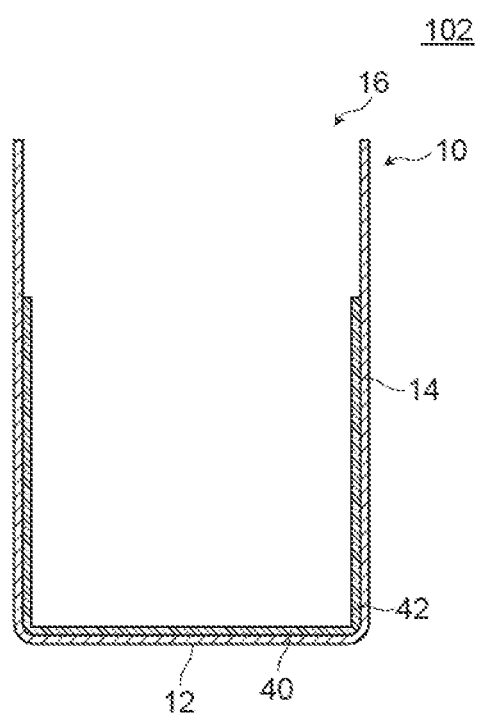
FIG. 6 is a view for explaining a housing for a solid electrolyte capacitor of the embodiment 4.

FIG. 6 is a view for explaining a housing for a solid electrolyte capacitor 102 of the embodiment 4.

The solid electrolyte capacitor 4 of the embodiment 4 basically has substantially the same configuration as the solid electrolyte capacitor 1 of the embodiment 1. However, the solid electrolyte capacitor 4 of the embodiment 4 differs from the solid electrolyte capacitor 1 of the embodiment 1 with respect to a point that an oxide film repairing body is disposed also between aside surface portion of the housing and the capacitor element. That is, in the solid electrolyte capacitor 4 of the embodiment 4, as shown in FIG. 5, the oxide film repairing body is disposed not only between the bottom surface portion 12 of the housing 10 and the capacitor element 20 (oxide film repairing body 40) but also between an inner side surface of the side surface portion 14 of the housing 10 and the capacitor element 20 (oxide film repairing body 42).

The oxide film repairing bodies 40, 42 are formed such that a polymer solution of a hydrophilic synthetic resin is applied by coating to the inner surface of the bottom surface portion 12 of the housing 10 and the side surface portion 14 of the housing 10 and, thereafter, the polymer solution is dried to an extent that the polymer solution is not completely dried thus forming films. In this manner, the housing for a solid electrolyte capacitor 102 of the embodiment 4 formed of the housing 10 and the oxide film repairing bodies 40, 42 is acquired (see FIG. 6). Other steps are substantially the same as the corresponding steps in the method of manufacturing the solid electrolyte capacitor 1 of the embodiment 1 and hence, the explanation of such steps is omitted.

As described above, the solid electrolyte capacitor 4 of the embodiment 4 differs from the solid electrolyte capacitor 1 of the embodiment 1 with respect to a point that the oxide film repairing body is arranged also between the side surface portion of the housing and the capacitor element. However, in the same manner as the solid electrolyte capacitor 1 of the embodiment 1, the oxide film repairing body 40 made of a hydrophilic synthetic resin is disposed between the bottom surface portion 12 of the housing 10 and the capacitor element 20. Accordingly, even when a defect occurs in an oxide film on the edge surface of the anode foil 22 or the cathode foil 24 where a defect is liable to occur in the oxide film, the defective portion can be repaired by moisture which the oxide film repairing body 40 retains. As a result, it is possible to provide a solid electrolyte capacitor having a high withstand voltage and a small leakage current, and a longer lifetime than a conventional solid electrolyte capacitor.

According to the solid electrolyte capacitor 4 of the embodiment 4, the oxide film repairing body 40 made of a hydrophilic synthetic resin is disposed between the bottom surface portion 12 of the housing 10 and the capacitor element 20 and hence, a size of a gap formed between the bottom surface portion 12 and the capacitor element 20 is reduced, and the oxide film repairing body functions as a buffer material whereby it is possible to provide a solid electrolyte capacitor having high vibration resistance.

According to the solid electrolyte capacitor 4 of the embodiment 4, the oxide film repairing body 40 made of a hydrophilic synthetic resin is disposed between the bottom surface portion 12 of the housing 10 and the capacitor element 20 and hence, it is possible to provide a solid electrolyte capacitor where sufficient insulating property is ensured between the bottom surface portion 12 and the capacitor element 20.

According to the solid electrolyte capacitor 4 of the embodiment 4, the oxide film repairing body 42 arranged between the side surface portion 14 and the capacitor element 20 also retains moisture and hence, the housing 10 can be brought into a state where a concentration of water vapor is high as a whole. As a result, the oxide film repairing body 40 arranged between the bottom surface portion 12 of the housing 10 and the capacitor element 20 can easily retain moisture.

According to the solid electrolyte capacitor 4 of the embodiment 4, the oxide film repairing body 42 made of a hydrophilic synthetic resin is disposed between the side surface portion 14 and the capacitor element 20 and hence, a size of a gap formed between the side surface portion 14 and the capacitor element 20 is reduced, and the oxide film repairing body 42 functions as a buffer material whereby it is possible to provide a solid electrolyte capacitor having high vibration resistance.

According to the solid electrolyte capacitor 4 of the embodiment 4, the oxide film repairing body 42 made of a hydrophilic synthetic resin is disposed between the side surface portion 14 and the capacitor element 20 and hence, it is possible to provide a solid electrolyte capacitor where sufficient insulating property is ensured between the side surface portion 14 and the capacitor element 20.

According to the housing for a solid electrolyte capacitor 102 of the embodiment 4, the oxide film repairing body 42 formed on the inner surface of the side surface portion 14 also retains moisture and hence, in the manufactured solid electrolyte capacitor, a concentration of water vapor in the inside of the whole housing 10 becomes high. As a result, the oxide film repairing body 40 arranged on the inner surface of the bottom surface portion 12 can easily retain moisture.

According to the housing for a solid electrolyte capacitor 102 of the embodiment 4, the oxide film repairing body 42 made of a hydrophilic synthetic resin is disposed between the side surface portion 14 of the housing 10 and the capacitor element 20 and hence, a size of a gap formed between the side surface portion 14 and the capacitor element 20 is reduced, and the oxide film repairing body 42 functions as a buffer material whereby it is possible to manufacture a solid electrolyte capacitor having high vibration resistance.

According to the housing for a solid electrolyte capacitor 102 of the embodiment 4, the oxide film repairing body 42 made of a hydrophilic synthetic resin is arranged also on the inner surface of the side surface portion 14 and hence, it is possible to manufacture a solid electrolyte capacitor where sufficient insulating property is ensured between the side surface portion 14 and the capacitor element 20.

The solid electrolyte capacitor 4 of the embodiment 4 has substantially the same configuration as the solid electrolyte capacitor 1 of the embodiment 1 except for that the oxide film repairing body is arranged also between the side surface portion of the housing and the capacitor element and hence, the solid electrolyte capacitor 4 of the embodiment 4 has advantageous effects acquired by the corresponding configurations of the solid electrolyte capacitor 1 of the embodiment 1 among advantageous effects which the solid electrolyte capacitor 1 of the embodiment 1 possesses.

Embodiment 5

Figure 7A:
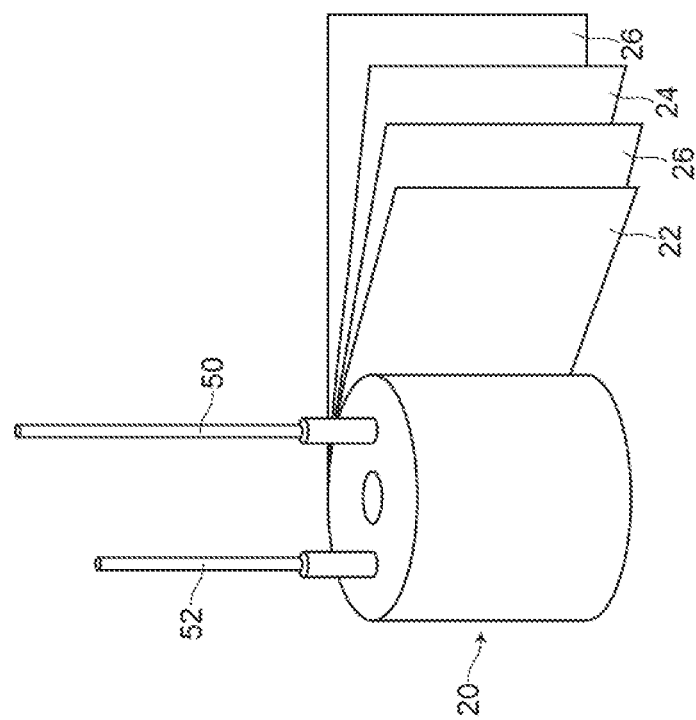
FIG. 7A and FIG. 7B are views for explaining a solid electrolyte capacitor of an embodiment 5.
Figure 7B:
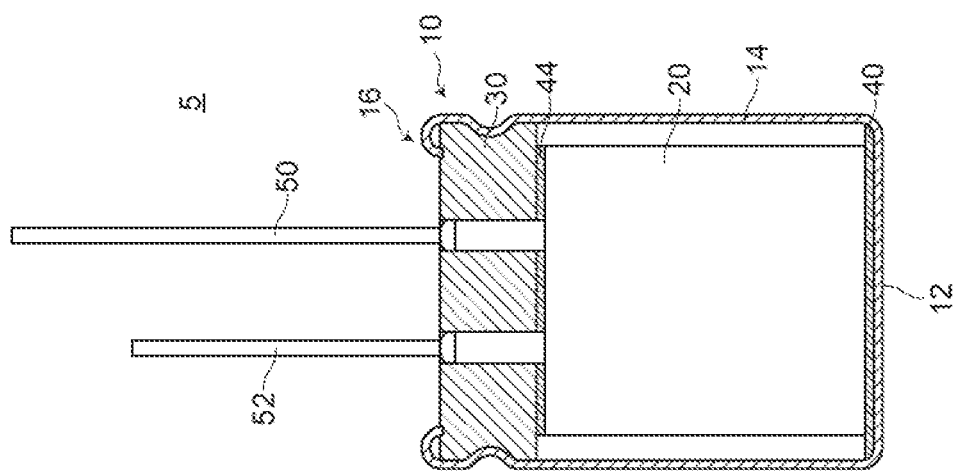

FIG. 7A and FIG. 7B are views for explaining a solid electrolyte capacitor 5 of an embodiment 5. FIG. 7A is a cross-sectional view of the solid electrolyte capacitor 5, and FIG. 7B is an exploded perspective view of a capacitor element 20.

Figure 8:
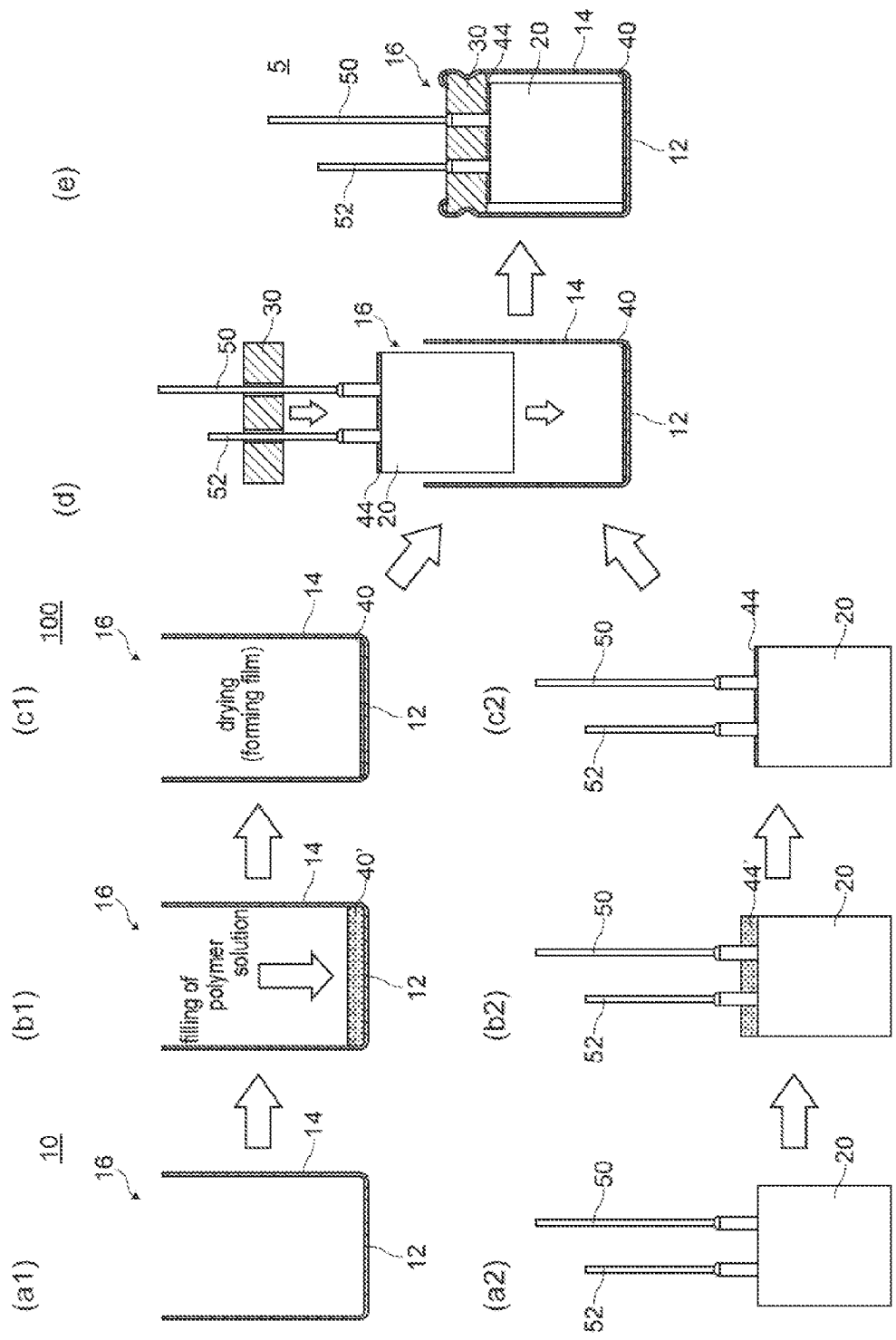
FIG. 8 is a view for explaining a method of manufacturing the solid electrolyte capacitor of the embodiment 5.

FIG. 8 is a view for explaining a method of manufacturing the solid electrolyte capacitor of the embodiments. FIG. 8(a1) to FIG. 8(c1), FIG. 8(a2) to FIG. 8(c2) and FIG. 8(d) to FIG. 8(e) are views showing respective steps.

The solid electrolyte capacitor 5 of the embodiment 5 has substantially the same configuration as the solid electrolyte capacitor 1 of the embodiment 1 basically. However, the solid electrolyte capacitor 5 of the embodiment 5 differs from the solid electrolyte capacitor 1 of the embodiment 1 with respect to a point that an oxide film repairing body is arranged also between the sealing member and the capacitor element. That is, in the solid electrolyte capacitor 5 of the embodiment 5, an oxide film repairing body 40 is disposed between the bottom surface portion 12 of the housing 10 and the capacitor element 20, and an oxide film repairing body 44 is disposed between the capacitor element 20 and the sealing member 30 (see FIG. 7)

In the same manner as the solid electrolyte capacitor 1 of the embodiment 1, the oxide film repairing body 40 is disposed between the bottom surface portion 12 of the housing 10 and the capacitor element 20.

The oxide film repairing body 44 is disposed between the capacitor element 20 and the sealing member 30. The oxide film repairing body 44 is formed on an end surface of the capacitor element 20 on a top surface side.

A method of forming the oxide film repairing body 40 arranged between the bottom surface portion 12 and the capacitor element 20 is substantially the same as the method of forming the oxide film repairing body 40 in the embodiment 1 (see FIG. 8(a1) to FIG. 8(c1)) and hence, the explanation of the method of forming the oxide film repairing body 40 is omitted.

The oxide film repairing body 44 can be formed as follows.

A method of forming the oxide film repairing body 44 is as follows. Firstly, the capacitor element 20 is prepared (see FIG. 8(a2)), and polymer solution 44' of a hydrophilic synthetic resin is adhered to an end surface of the capacitor element 20 on the top surface side (see FIG. 8(b2)). Thereafter, a film is formed by drying the polymer solution 44' to an extent that moisture in the polymer solution 44' is not completely dried thus forming the oxide film repairing body 44 (see FIG. 8(c2)).

The subsequent steps (see FIG. 8(d) to FIG. 8(e)) are substantially the same as the corresponding steps in the method of manufacturing the solid electrolyte capacitor of the embodiment 1 and hence, the explanation of such steps is omitted.

As described above, the solid electrolyte capacitor 5 of the embodiment 5 differs from the solid electrolyte capacitor 1 of the embodiment 1 with respect to a point that the oxide film repairing body is arranged also between the sealing member and the capacitor element. However, in the same manner as the solid electrolyte capacitor 1 of the embodiment 1, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the sealing member 30 and the capacitor element 20. Accordingly, even when a defect occurs in an oxide film on the edge surface of the anode foil 22 or the cathode foil 24 where a defect is liable to occur in the oxide film, the defective portion can be repaired by moisture which the oxide film repairing bodies 40, 44 retain. As a result, it is possible to provide a solid electrolyte capacitor having a high withstand voltage and a small leakage current, and a longer lifetime than a conventional solid electrolyte capacitor.

According to the solid electrolyte capacitor 5 of the embodiment 5, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30. Accordingly, it is possible to provide a solid electrolyte capacitor where sufficient insulating property is ensured between the bottom surface portion 12 and the capacitor element 20 and between the capacitor element 20 and the sealing member 30.

According to the solid electrolyte capacitor 5 of the embodiment 5, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30 and hence, a size of a gap formed between the bottom surface portion 12 and the capacitor element 20 and a size of a gap formed between the capacitor element 20 and the sealing member 30 are reduced, and the oxide film repairing bodies 40, 44 function as buffer members whereby it is possible to provide a solid electrolyte capacitor having high vibration resistance.

A defect is liable to occur in the oxide film at an edge portion of the anode foil 22 on a top surface side or an edge portion of the cathode foil 24 on a top surface side. According to the solid electrolyte capacitor 5 of the embodiment 5, a defective portion can be rapidly repaired by moisture which the oxide film repairing body 44 retains. As a result, it is possible to provide a solid electrolyte capacitor having a high withstand voltage and a small leakage current, and a longer lifetime than a conventional solid electrolyte capacitor.

According to the solid electrolyte capacitor 5 of the embodiment 5, even when the sealing member 30 has conductivity due to added carbon or the like, compared to a case where the oxide film repairing body 44 is not arranged, it is possible to provide a solid electrolyte capacitor where sufficient insulating property is ensured between the capacitor element 20 and the sealing member 30.

According to the solid electrolyte capacitor 5 of the embodiment 5, the oxide film repairing body 44 is formed so as to be brought into contact with the edge portion of the anode foil 22 on the top surface side and the edge portion of the cathode foil 24 on the top surface side where a defect is liable to occur in the oxide film and hence, moisture can be efficiently supplied to the defective portion.

The solid electrolyte capacitor 5 of the embodiment 5 has substantially the same configuration as the solid electrolyte capacitor 1 of the embodiment 1 except for that the oxide film repairing body is arranged also between sealing member and the capacitor element. Accordingly, the solid electrolyte capacitor of the embodiment 5 also acquires advantageous effects acquired by the corresponding configurations of the solid electrolyte capacitor 1 of the embodiment 1 among advantageous effects which the solid electrolyte capacitor 1 of the embodiment 1 possesses.

[Modification 3]

Figure 9:
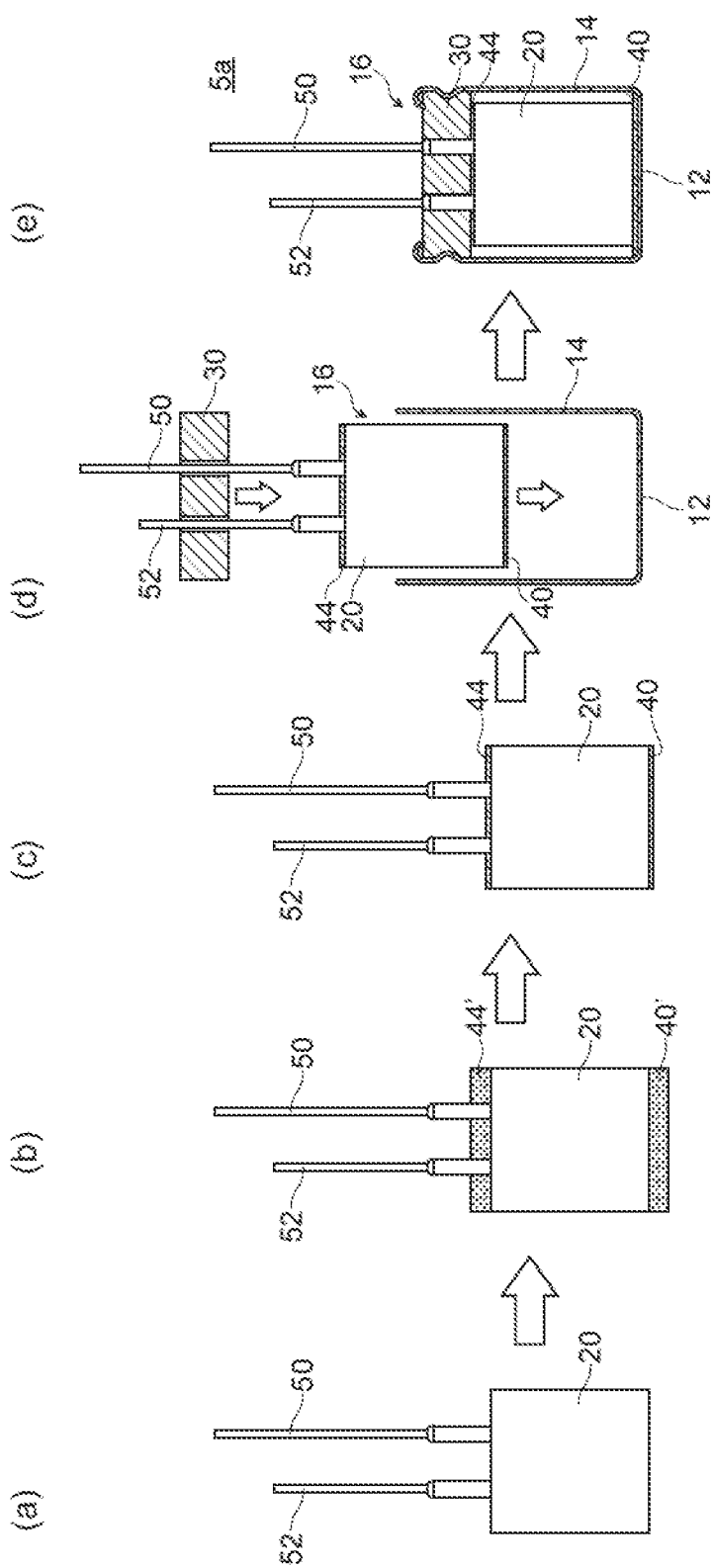
FIG. 9 is a view for explaining a method of manufacturing a solid electrolyte capacitor of a modification 3.

FIG. 9 is a view for explaining a method of manufacturing a solid electrolyte capacitor of the embodiment 3. FIG. 9(a) to FIG. 9(e) are views showing respective steps.

In a solid electrolyte capacitor 5a of the modification 3, as shown in FIG. 9, the oxide film repairing body 40 is formed on an end surface of the capacitor element 20 on the bottom surface side. In this manner, even when the oxide film repairing body 40 is formed on the end surface of the capacitor element on the bottom surface side, in the same manner as the embodiment 5, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30. Accordingly, even when a defect occurs in an oxide film on the edge surface of the anode foil 22 or the cathode foil 24 where a defect is liable to occur in the oxide film, the defective portion can be repaired by moisture which the oxide film repairing bodies 40, 44 retain. As a result, it is possible to provide a solid electrolyte capacitor having a high withstand voltage and a small leakage current, and a longer lifetime than a conventional solid electrolyte capacitor.

Embodiment 6

Figure 10:
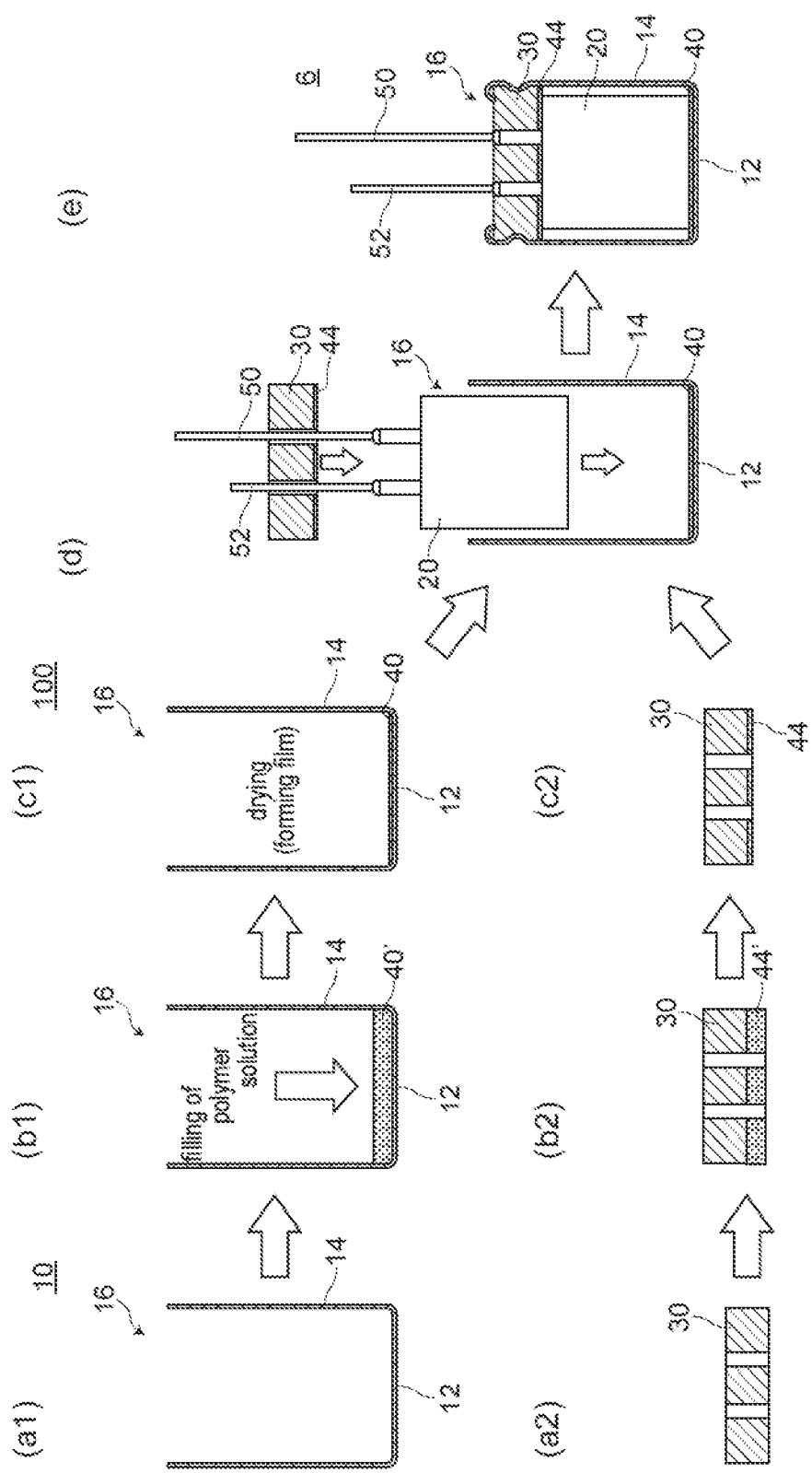
FIG. 10 is a view for explaining a method of manufacturing a solid electrolyte capacitor of an embodiment 6.

FIG. 10 is a view for explaining a method of manufacturing a solid electrolyte capacitor 6 of an embodiment 6. FIG. 10(a1) to FIG. 10(c1), FIG. 10(a2) to FIG. 10(c2) and FIG. 10(d) to FIG. 10(e) are views showing respective steps.

Although the solid electrolyte capacitor 6 of the embodiment 6 basically has substantially the same configuration as the solid electrolyte capacitor 5 of the embodiment 5, the solid electrolyte capacitor 6 of the embodiment 6 differs from the solid electrolyte capacitor 5 of the embodiment 5 with respect to a position where the oxide film repairing body is disposed. That is, in the solid electrolyte capacitor 6 of the embodiment 6, as shown in FIG. 10, the oxide film repairing body 44 is formed on a surface of the sealing member 30 on the bottom surface side.

In the same manner as the solid electrolyte capacitor 1 of the embodiment 1, the oxide film repairing body 40 is disposed between the bottom surface portion 12 of the housing 10 and the capacitor element 20 (see FIG. 10(a1) to FIG. 10(c1)).

The oxide film repairing body 44 is formed as follows. Firstly, the sealing member 30 is prepared (see FIG. 10(a2)), and a polymer solution 44' of a hydrophilic synthetic resin is adhered to a surface of the sealing member on the bottom surface side (see FIG. 10(b2)). Thereafter, a film is formed by drying the polymer solution 44' to an extent that moisture in the polymer solution 44' is not completely dried thus forming the oxide film repairing body 44 (see FIG. 10(c2)).

As described above, the solid electrolyte capacitor 6 of the embodiment 6 differs from the solid electrolyte capacitor 5 of the embodiment 5 with respect to a position where the oxide film repairing body is disposed. However, in the same manner as the solid electrolyte capacitor 5 of the embodiment 5, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30. Accordingly, even when a defect occurs in an oxide film on the edge surface of the anode foil 22 or the cathode foil 24 where a defect is liable to occur in the oxide film, the defective portion can be repaired by moisture which the oxide film repairing bodies 40, 44 retain. As a result, it is possible to provide a solid electrolyte capacitor having a high withstand voltage and a small leakage current, and a longer lifetime than a conventional solid electrolyte capacitor.

According to the solid electrolyte capacitor 6 of the embodiment 6, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30 and hence, a size of a gap formed between the bottom surface portion 12 and the capacitor element 20 and a size of a gap formed between the capacitor element 20 and the sealing member 30 are reduced, and the oxide film repairing bodies 40, 44 function as buffer members whereby it is possible to provide a solid electrolyte capacitor having high vibration resistance.

According to the solid electrolyte capacitor 6 of the embodiment 6, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30 and hence, it is possible to provide a solid electrolyte capacitor where sufficient insulating property is ensured between the bottom surface portion 12 and the capacitor element 20 and between the capacitor element 20 and the sealing member 30.

According to the solid electrolyte capacitor 6 of the embodiment 6, the oxide film repairing body 44 is formed on a surface of the sealing member 30 on the bottom surface side and hence, even when irregularities are formed on an end surface of the capacitor element 20 on a top surface side, the oxide film repairing body 44 can be arranged between the capacitor element 20 and the sealing member 30.

The solid electrolyte capacitor 6 of the embodiment 6 has substantially the same configuration as the solid electrolyte capacitor 5 of the embodiment 5 except for a position where the oxide film repairing body is disposed and hence, the solid electrolyte capacitor 6 of the embodiment 6 has advantageous effects acquired by the corresponding configurations of the solid electrolyte capacitor 5 of the embodiment 5 among advantageous effects which the solid electrolyte capacitor 5 of the embodiment 5 possesses.

[Modification 4]

Figure 11:
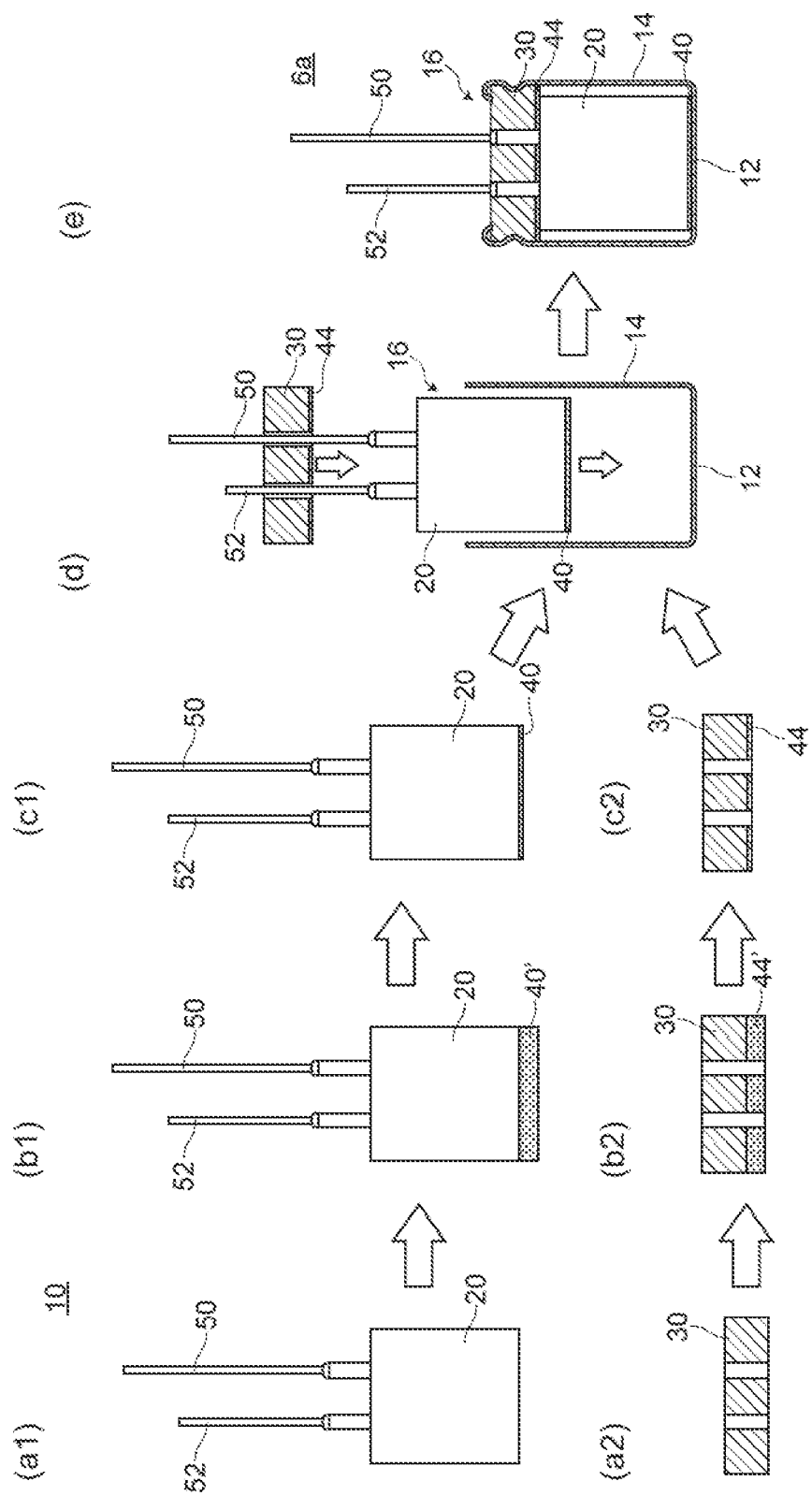
FIG. 11 is a view for explaining a method of manufacturing a solid electrolyte capacitor of a modification 4.

FIG. 11 is a view for explaining a method of manufacturing a solid electrolyte capacitor 6a of the embodiment 4. FIG. 11(a1) to FIG. 11(c1), FIG. 11(a2) to FIG. 11(c2) and FIG. 11(d) to FIG. 11(e) are views showing respective steps.

In the solid electrolyte capacitor 6a of the modification 4, as shown in FIG. 11, the oxide film repairing body 40 arranged between the bottom surface portion 12 and the capacitor element 20 is formed on the end surface of the capacitor element 20 on the bottom surface side. In this manner, even when the oxide film repairing body 40 arranged between the bottom surface portion 12 and the capacitor element 20 is formed on the end surface of the capacitor element 20 on the bottom surface side, in the same manner as the embodiment 6, the oxide film repairing body 40 made of a hydrophilic synthetic resin is disposed between the bottom surface portion 12 of the housing 10 and the capacitor element 20 and the oxide film repairing body 44 made of a hydrophilic synthetic resin is disposed between the capacitor element 20 and the sealing member 30. Accordingly, even when a defect occurs in an oxide film on the edge surface of the anode foil 22 or the cathode foil 24 where a defect is liable to occur in the oxide film, the defective portion can be repaired by moisture which the oxide film repairing bodies 40, 44 retain. As a result, it is possible to provide a solid electrolyte capacitor having a high withstand voltage and a small leakage current, and a longer lifetime than a conventional solid electrolyte capacitor.

TEST EXAMPLE

FIG. 12A and FIG. 12B are tables showing data on synthetic resins used in respective test examples and evaluation results of the test examples. FIG. 12A is the table showing data on the synthetic resins used in the respective test examples, and FIG. 12B is the table showing the evaluation results of the synthetic resins used in the respective test examples.

Test Example 1

The test example 1 is a test example for ascertaining that a synthetic resin used for forming the oxide film repairing body according to the present invention can retain a larger amount of moisture than synthetic resins used in the comparison examples 1 and 2.

1. Preparation of Specimens (1) Specimen 1 (Present Invention Example)

100 g of aqueous solution is prepared by dissolving 5 g of polyacrylamide and 2.5 g of ethylene glycol which are materials for forming the oxide film repairing body in the embodiment 1 into water. Thereafter, out of 100 g of aqueous solution, 20 g of the aqueous solution is filled into a petri dish, and a film-like specimen is prepared by drying the filled aqueous solution until no weight change occurs in the film-like specimen. This film-like specimen is used as a specimen 1. Ethylene glycol is added to the specimen 1 so as to enhance dispersibility of the specimen 1. Ethylene glycol is added also to specimen 2 described hereinafter in the same manner.

(2) Specimen 2 (Comparison Example 1)

100 g of aqueous solution is prepared by dissolving 5 g of polyvinyl alcohol and 2.5 g of ethylene glycol into water. Thereafter, out of 100 g of aqueous solution, 20 g of aqueous solution is filled into a petri dish, and a film-like specimen is prepared by drying the filled aqueous solution until no weight change occurs in the film-like specimen. This film-like specimen is used as a specimen 2.

(3) Specimen 3 (Comparison Example 2)

1 g of polypropylene in a film shape is placed on a petri dish, and a film-like specimen is prepared by drying the polypropylene until no weight change occurs in the film-like specimen. This film-like specimen is used as a specimen 3.

2. Evaluation Method

Evaluation is carried out by measuring a change in weight in such a manner that the petri dishes in which the respective specimens are placed are left in the inside of a room (temperature 24° C., humidity 30%, RH atmosphere) and, thereafter, the weights of the specimens are measured. When a change in weight from a point of time immediately after the start of the measurement to a point of time where no change in weight occurs in all specimens (a point of time where 30 hours have elapsed from the start of the measurement) is 0.05 g or more, it is determined that the specimen can retain a large amount of moisture, and evaluation "good" is given to the specimen. When a change in weight from a point of time immediately after the start of the measurement to a point of time where no change in weight occurs in all specimens is 0.01 g or more and less than 0.05 g, it is determined that the specimen can retain moisture to some extent, and evaluation "fair" is given to the specimen. When a change in weight from a point of time immediately after the start of the measurement to a point of time where no change in weight occurs in all specimens is less than 0.01 g, it is determined that the specimen minimally retains moisture, and evaluation "bad" is given to the specimen.

3. Result of Evaluation

Figure 13:
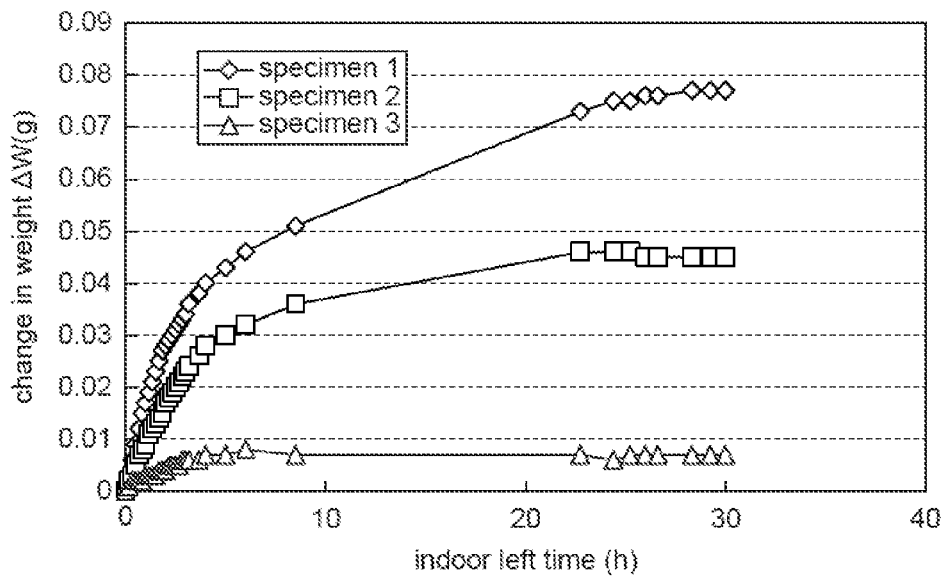
FIG. 13 is a graph showing the result of the test example 1.

FIG. 13 is a view showing the result of the test example 1.

As can be also understood from FIG. 13, in the specimen 1, a change in weight from a point of time immediately after the start of the measurement to a point of time where no change in weight occurs in the specimen is 0.077 g and hence, evaluation "good" is given to the specimen 1. In the specimen 2, a change in weight from a point of time immediately after the start of the measurement to a point of time where no change in weight occurs in the specimen is 0.045 g and hence, evaluation "fair" is given to the specimen 2. In the specimen 3, a change in weight from a point of time immediately after the start of the measurement to a point of time where no change in weight occurs in the specimen is 0.007 g and hence, evaluation "bad" is given to the specimen 3. Accordingly, it is understood that a synthetic resin used for forming the oxide film repairing body according to the present invention can retain a larger amount of moisture than a synthetic resin used in the comparison examples 1 and 2. It is understood that although a synthetic resin used for forming the oxide film repairing body in the comparison example 1 can retain a larger amount of moisture than a synthetic resin used in the comparison example 2, the synthetic resin used for forming the oxide film repairing body in the comparison example 1 retains a smaller amount of moisture than the synthetic resin used for forming the oxide film repairing body according to the present invention.

Test Example 2

The test example 2 is a test example for ascertaining that the solid electrolyte capacitor according to the present invention has a longer lifetime property than the solid electrolyte capacitors in the comparison examples 1 and 2 which uses a synthetic resin for forming an oxide film repairing body.

1. Preparation of Specimens (1) Specimen 4 (Present Invention Example)

A solid electrolyte capacitor substantially the same as the solid electrolyte capacitor 1 of the embodiment 1 is prepared and the solid electrolyte capacitor is used as a specimen 4.

(2) Specimen 5 (Comparison Example 1)

A solid electrolyte capacitor substantially the same as the solid electrolyte capacitor of the specimen 4 except for that an oxide film repairing body made of polyvinyl alcohol is used is prepared and the solid electrolyte capacitor is used as a specimen 5.

(3) Specimen 6 (Comparison Example 2)

A solid electrolyte capacitor substantially the same as the solid electrolyte capacitor of the specimen 4 except for that an oxide film repairing body made of polypropylene is used is prepared and the solid electrolyte capacitor is used as a specimen 6.

2. Evaluation Method

After the respective specimens are placed stationarily in the inside of a thermostatic bath at a temperature of 125° C., a leakage current is measured in a state where a prescribed DC voltage is applied to the respective specimens. The measurement of a leakage current is performed for every 250 hours using Digital Multimeter 73401 made by Yokogawa Meters and Instruments Corporation. As a result, when a leakage current after 5000 hours have elapsed from the start of the measurement is 5 times as large as an initial value or less, evaluation "good" is given to the specimen, and when a leakage current becomes more than 5 times as large as an initial value before 5000 hours have elapsed from the start of the measurement, evaluation "bad" is given to the specimen.

3. Evaluation Result

Figure 14:
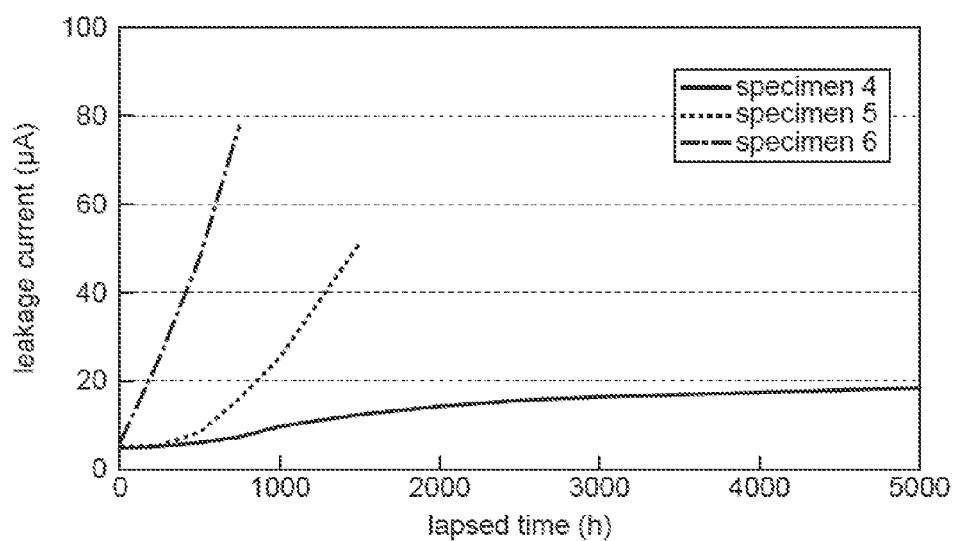
FIG. 14 is a graph showing the result of the test example 2.
Figure 15A:
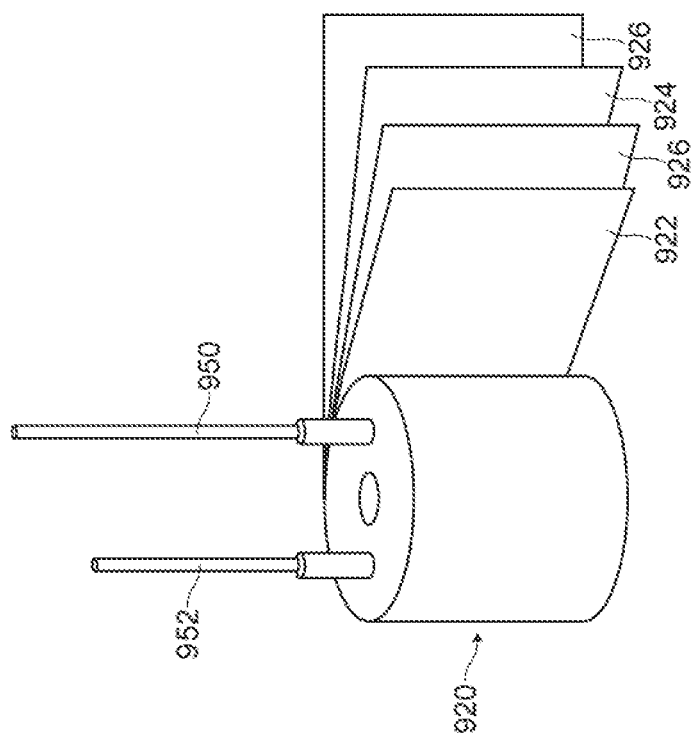
FIG. 15A and FIG. 15B are views for explaining a conventional electrolyte capacitor.
Figure 15B:
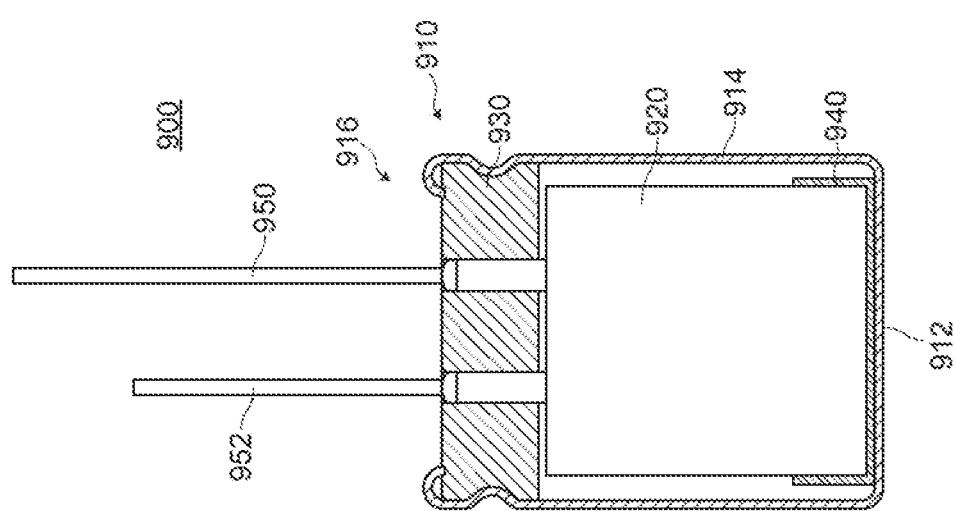

FIG. 14 shows the result of the test example 2.

As can be understood also from FIG. 14, in the specimen 6, a leakage current is increased from a point of time immediately after the start of the measurement. The leakage current is suddenly increased. A leakage current after 1000 hours have elapsed from the start of the measurement is 5 times as large as an initial value. In the specimen 5, a leakage current is suddenly increased from approximately a point of time after 500 hours have elapsed from the start of the measurement, and a leakage current after 1000 hours have elapsed from the start of the measurement is 5 times or more as large as an initial value. To the contrary, in the specimen 4, even when 5000 hours have elapsed from the start of the measurement, a leakage current is not suddenly increased, and a leakage current after 5000 hours have elapsed from the start of the measurement is 5 times as large as an initial value or less. Accordingly, it is understood that the solid electrolyte capacitor according to the present invention is a solid electrolyte capacitor having a longer life time than the solid electrolyte capacitors of the comparison example 1 and the comparison example 2 formed using a synthetic resin.

Although the present invention has been described based on the above-mentioned embodiments, the present invention is not limited to the above-mentioned embodiments. The present invention can be carried out in various modes without departing from the gist according to the present invention, and the following modifications are also conceivable, for example.

(1) In the above-mentioned respective embodiments, the present invention has been explained by taking a case where capacitor element 20 to which a chemical conversion treatment is applied is stored in the housing 10 as an example. However, the present invention is not limited to such a case. For example, even in the case where the capacitor element 20 to which a chemical conversion treatment is not applied is housed in the housing 10 and, thereafter, a chemical conversion treatment is applied to the capacitor element 20, the present invention is applicable.

(2) In the above-mentioned respective embodiments, the present invention has been explained by taking a case where the capacitor element 20 and the sealing member 30 are formed into an integral body and, thereafter, the integral body is housed in the housing 10 as an example. However, the present invention is not limited to such a case. For example, even in the case where the capacitor element 20 is housed in the housing 10 and, thereafter, the capacitor element 20 and the sealing member 30 are formed into an integral body, the present invention is applicable.

(3) In the above-mentioned embodiment 6, the present invention has been explained by taking a case where the oxide film repairing body 44 is formed on the sealing member 30 and, thereafter, the sealing member 30 and the capacitor element 20 are formed into an integral body and, then, the integral body is housed in the housing 10 as an example. However, the present invention is not limited to such a case. For example, even in the case where the capacitor element 20 is housed in the housing 10 and, thereafter, the oxide film repairing body 44 is formed on the sealing member 30 and, then, the sealing member 30 and the capacitor element 20 are formed into an integral body, the present invention is applicable.

(4) In the above-mentioned embodiments 1 and 6 and modification 2, the present invention has been explained by taking a case where the housing for a solid electrolyte capacitor 100 is used as an example. However, the present invention is not limited to such a case. For example, even in the case where the housing for a solid electrolyte capacitor 102 is used in place of the housing for a solid electrolyte capacitor 100, the present invention is applicable.

(5) In the above-mentioned embodiment 4, the present invention has been explained by taking a case where the oxide film repairing body 42 is formed on the whole surface of the side surface portion 14 as an example. However, the present invention is not limited to such a case. For example, even in the case where the oxide film repairing body 42 is formed on a portion of the side surface portion 14, the present invention is applicable.

(6) In the above-mentioned embodiment 4, the present invention has been explained by taking a case where the oxide film repairing body is formed on the inner surface of the bottom surface portion 12 of the housing 10 and the inner surface of the side surface portion 14 as an example. However, the present invention is not limited to such a case. For example, even when the oxide film repairing body is formed on the end surface of the capacitor element 20 on the bottom surface side and the surface of the capacitor element 20 on the side surface side, the present invention is applicable.

(7) In the above-mentioned respective embodiments, the present invention has been explained by taking a case where the oxide film repairing body is formed on the housing, capacitor element or (and) sealing member which are prepared in advance as an example. However, the present invention is not limited to such a case. For example, even when an oxide film repairing body which is formed in advance is disposed on the housing, the capacitor element or (and) sealing member, the present invention is applicable.

What is claimed is:

1. A solid electrolyte capacitor comprising:
    a bottomed cylindrical housing having a bottom surface portion, a side surface portion raised from the bottom surface portion and an opening portion formed on an end portion of the side surface portion;
    a capacitor element housed in the inside of the housing, the capacitor element being formed by winding an anode foil and a cathode foil in an overlapping state with a separator interposed therebetween and by filling a solid electrolyte between the anode foil and the cathode foil; and
    a sealing member sealing the opening portion of the housing in a state where the capacitor element is housed in the inside of the housing, wherein
    an oxide film repairing body made of a hydrophilic synthetic resin is disposed at least one of between the bottom surface portion of the housing and the capacitor element and between the capacitor element and the sealing member, and is configured such that even when a defect occurs in an oxide film on the edge surface of the anode foil or the cathode foil of the capacitor element a defective portion is repaired by moisture which the oxide film repairing body retains.

2. The solid electrolyte capacitor according to claim 1, wherein the oxide film repairing body is made of a synthetic resin which includes a hydrophilic functional group in a side chain.

3. The solid electrolyte capacitor according to claim 2, wherein the hydrophilic functional group is one selected from a group consisting of a phenolic group, a hydroxyphenyl carboxylic acid group, a hydroxyalkyl group, an amino group, a carbonyl group, a carboxyl group, a sulfonic acid group, an amide group and a phosphate ester group.

4. The solid electrolyte capacitor according to claim 3, wherein the hydrophilic functional group is one selected from a group consisting of a phenolic group, a hydroxyphenyl carboxylic acid group, a hydroxyalkyl group, a carboxyl group, a sulfonic acid group and a phosphate ester group.

5. The solid electrolyte capacitor according to claim 3, wherein the hydrophilic functional group is an amino group.

6. The solid electrolyte capacitor according to claim 3, wherein the hydrophilic functional group is one selected from a group consisting of a phenolic group, a hydroxyphenyl carboxylic acid group, a hydroxyalkyl group, an amino group, a carbonyl group, a carboxyl group, an amide group and a phosphate ester group.

7. The solid electrolyte capacitor according to claim 1, wherein the oxide film repairing body is made of a synthetic resin having bonding which exhibits hydrogen bonding in a main chain, and contains 2 wt % or more of moisture.

8. The solid electrolyte capacitor according to claim 7, wherein the bonding which exhibits hydrogen bonding is ether bonding, carbonyl bonding, amide bonding or ester bonding.

9. The solid electrolyte capacitor according to claim 7, wherein the bonding which exhibits hydrogen bonding is carbonyl bonding, amide bonding or ester bonding.

10. The solid electrolyte capacitor according to claim 1, wherein the oxide film repairing body is disposed between the bottom surface portion and the capacitor element which opposedly faces the bottom surface portion.

11. The solid electrolyte capacitor according to claim 10, wherein the oxide film repairing body is arranged also between the sealing member and the capacitor element.

12. The solid electrolyte capacitor according to claim 10, wherein the oxide film repairing body is arranged also between the side surface portion and the capacitor element.

13. A housing for a solid electrolyte capacitor having a bottomed cylindrical shape for housing the solid electrolyte capacitor, the housing comprising:
    a bottom surface portion;
    a side surface portion raised from the bottom surface portion; and
    an opening portion formed on an end portion of the side surface, wherein
    an oxide film repairing body made of a hydrophilic synthetic resin is disposed on an inner surface of the bottom surface portion, and is configured such that even when a defect occurs in an oxide film on the edge surface of the anode foil or the cathode foil of the capacitor element a defective portion is repaired by moisture which the oxide film repairing body retains in case of using the housing for the solid electrolyte capacitor.

14. The housing for a solid electrolyte capacitor according to claim 13, wherein the oxide film repairing body made of a hydrophilic synthetic resin is also formed also on an inner surface of the side surface portion.

* * * * *